May 18, 1965 D. S. HORSLEY 3,184,542
VIDEO RECORDING AND REPRODUCTION WITH REDUCED REDUNDANCY
Filed March 15, 1961 5 Sheets-Sheet 2

INVENTOR.
DAVID S. HORSLEY
BY *Harry R. Lubcke*
AGENT

May 18, 1965         D. S. HORSLEY         3,184,542

VIDEO RECORDING AND REPRODUCTION WITH REDUCED REDUNDANCY

Filed March 15, 1961         5 Sheets-Sheet 3

INVENTOR.
DAVID S. HORSLEY
BY Harry R. Lubcke
AGENT

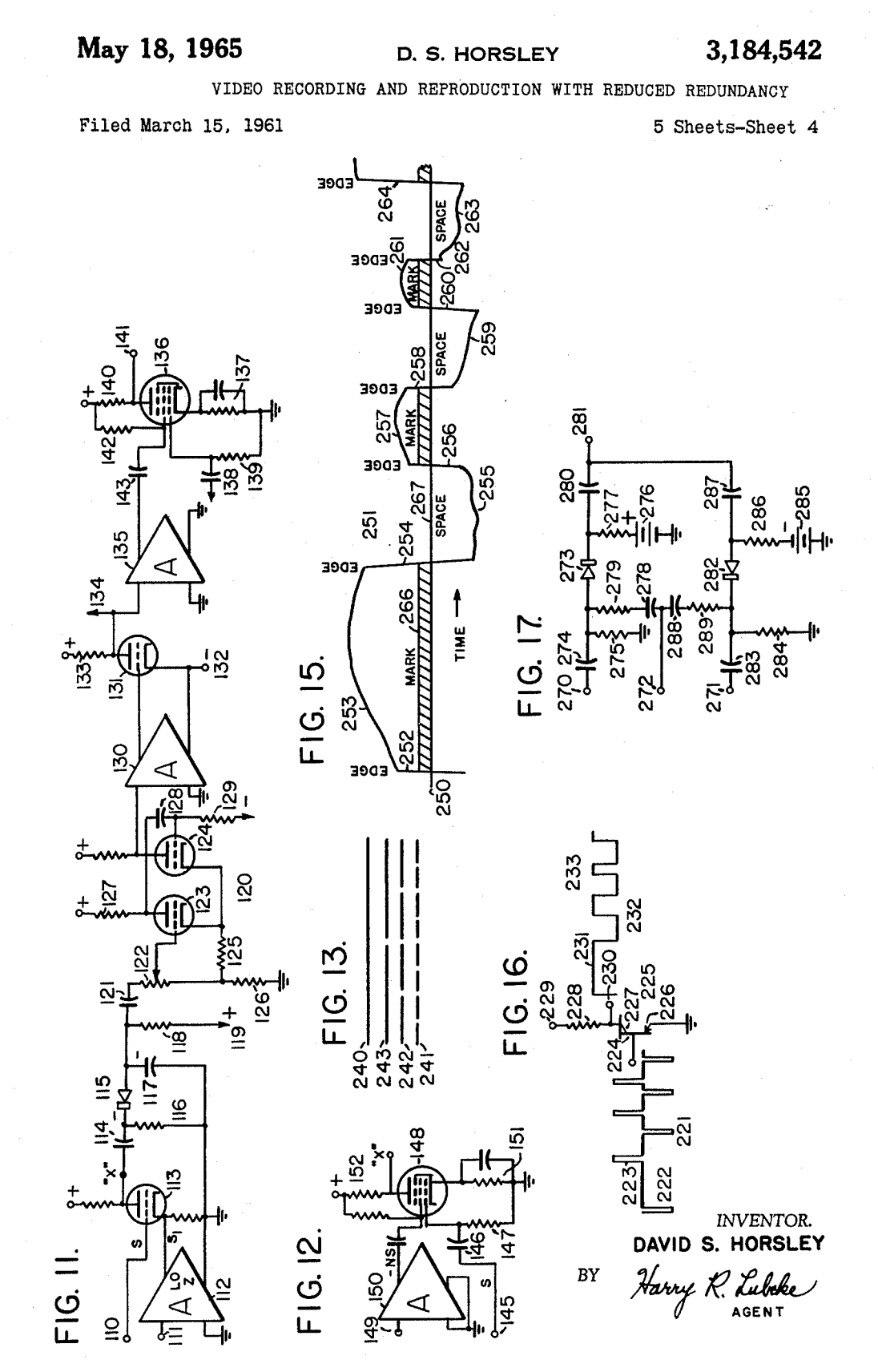

May 18, 1965　　　D. S. HORSLEY　　　3,184,542
VIDEO RECORDING AND REPRODUCTION WITH REDUCED REDUNDANCY
Filed March 15, 1961　　　　　　　　　　5 Sheets-Sheet 4

INVENTOR.
DAVID S. HORSLEY
BY Harry R. Lubcke
AGENT

May 18, 1965 D. S. HORSLEY 3,184,542
VIDEO RECORDING AND REPRODUCTION WITH REDUCED REDUNDANCY
Filed March 15, 1961 5 Sheets-Sheet 5

FIG. 14.

INVENTOR.
DAVID S. HORSLEY
BY Harry R. Lubcke
AGENT

3,184,542
VIDEO RECORDING AND REPRODUCTION WITH REDUCED REDUNDANCY
David S. Horsley, 3929 Kentucky Drive, Hollywood, Calif.
Filed Mar. 15, 1961, Ser. No. 95,988
14 Claims. (Cl. 178—6.7)

My invention relates to a method and apparatus for electrically permanently recording visual images and particularly to a method and apparatus for reducing redundancy in a record of this kind.

In an electro-optical process such as television it is well known that redundancy of the visual information causes the system to be wasteful of transmission facilities. The system operates full time at maximum potential capability but is often employed to only an insignificant fraction of this capability. Particularly is this true from line to line when a blank sky is being transmitted, from frame to frame when a stationary title is being transmitted, and at various other times when vertically identical portions of a scene are being transmitted, as the stakes of a picket fence.

I am able to greatly reduce the redundancy in a record of a television-like process by employing time-space de-magnification. I separate the video information representing the scene into three components; information as to where significant "edges" occur, information as to the tones of the scene, and control information not explicit in the scene but generated from my analysis of the edge and tonal information and employed in displaying the final image.

In my method I employ variable velocities in transport of the records and in the scans thereacross to eliminate redundancy.

In one aspect of my method and apparatus, the trigger track record used to delineate edges moves continuously and is a part of the control track and the sound recording tape, so that two tapes of simplified format constitute the complete record.

In another aspect of my method and apparatus the trigger track moves intermittently as do the tonal records, each type of track independently according to minimum informational requirements. Three tapes of simplified format constitute the complete record in this aspect.

In any aspect of my invention the tonal records tape is stopped when the tonal information from line to line or from frame to frame is repetitive and the information recorded once is used again by rescanning. Furthermore, the tonal records are anamorphosed as an inverse function of the rapidity of change of tonal information. This is most easily accomplished in octave relationships. That is, the frequency response need is determined for each line of television-like scanning. If this is relatively high, the whole width of the tonal record is employed for recording. If the most rapid change of tone is of the order of one-half the above maximum rapidity of change, then the recording velocity upon the tonal record is reduced to one-half and two lines are recorded in the space previously occupied by one line. This aspect is determined to a degree extending, say, to one-eighth, in which instance eight lines of tonal information are contained in one line of recording across the tonal record.

In reproducing the image, the reading beam for tonal reproduction is cued to the proper velocity of scan by information on the control track. It will be appreciated that for the gradual variation of tone in a typical sky the one-eighth octave space upon the tonal record is fully adequate to render the sky in reproduction.

In instances of frame to frame identicalness, I obtain the equivalent of instantaneous stopping and starting of the tonal record by impressing a velocity upon the scanning beam for that record equivalent to the finite deceleration or acceleration of the record and in the direction of travel thereof.

It will be appreciated that by my novel method of trading time requirements for space upon the record I am able to effect a saving in the record of up to hundreds of times over the basic television-like process. I employ velocity of scanning a record in two dimensions as a parameter to effect redundancy removal. While this is a wide departure from any prior methods aimed at economy in channel utilization, I am able to implement my method by highly practical instrumentalities.

It will be understood that redundancy in the matter of edge rendition can be greatly reduced. For example, in the repetitious rendering of a stationary title the edge information of a whole frame may be repeated by merely re-scanning such information that has been recorded only once. Also, in the absence of edges over part of a scene; such as in the sky, in a foreground of relatively homogeneous soil, in the out of focus "head room" above a closeup, or in any of the equivalents of these conditions, I do not progress the trigger track to provide edge information. Space savings on this edge record of the order of those on the tonal record are thus seen to be made, but for much different reasons. This is indicative of my novel manner of handling video information.

The rendition of the optical information of a real scene upon a plane in optical imaging is a simplification that results in decreased sharpness of those objects lying away from that plane. Thus, in practical imaging with a lens we find considerable areas in which edges do not occur and so the tonal variations of the image are carried by my tonal records alone.

Briefly, my method embraces the steps of forming a transition from mark to space or vice versa on a trigger track at each "edge" in the scene to be recorded. An edge is defined as an extreme variation of tonal value in the scene, the angle of the scanning vector for which approaches 90° and which variation crosses the A.C. axis of the video signal. Minor contrast excursions, though rapid, that occur off of the A.C. axis as I choose to determine it in a quasi-incremental fashion are ignored and are reproduced only as averaged variations of tone. This has little effect upon the appearance of the reproduced image and results in a significant reduction of the maximum frequency requirement for the tonal records.

The scanning vector is defined as that line connecting elements of the scene being recorded plotted in terms of amplitude of tonal value; i.e., black through shades of gray to white, as a function of time, in which the time scale is that of the television-like scanning process. Obviously, a change from a dark gray to a light gray in a very small traverse of the scene is an "edge," as is a somewhat slower transition from all black to all white. The tangent is the same for both and the angle approaches 90° for both. However, a gradual change from one tonal value to another has a small first-quadrant angle and thus is not an "edge."

Another of the steps in my method involves forming two tonal values. These are the values which define the tones appearing on opposite sides of an impending edge. The "tone occurring" is the one present in the scene prior to the edge involved, such as a dark gray, for example, while the "tone impending" is the one to be present in the scene subsequent in scanning time to the edge involved, such as a light gray.

A pulse of the edge derived from the trigger track provides the information to accomplish a switching action from the tone occurring to the tone impending in the reproducing process. Since any tone occurring persists for a relatively long time compared to the brief interval required for the rendition of an edge in ordinary television scanning, it is seen that the dual tonal records allow relatively much time for altering the tonal values on those records. What is to be the tone impending for the next edge need only reach the proper tonal value only sufficiently fast to be ready at the time the next edge terminates the tone occurring. This obviously results in a relatively low maximum frequency required of the tonal channels.

It will be realized that this order of redundancy removal makes it economically feasible for an individual or a business enterprise to maintain a visual library. This may be for entertainment, for instruction or for record purposes. The storage facilities required are likewise at a minimum.

Where my record is employed as an intermediate step to transmission of information over a communication channel, it is seen that the high order of redundancy removal effects great savings in either channel bandwidth or in transmission time, or in any desired combination of these parameters, depending upon the speed of processing the already concentrated record. This capability makes practical visual transmissions over narrow bandwidth channels within feasible periods of time, or over wide channels in very brief periods of time.

Various media are suitable for the record in my system. Any medium upon which a simple amplitude can be recorded may be employed. Known motion picture film for recording tonal information as opacities is one example. Similarly, edge information is recorded upon high contrast stock having excellent resolution. Of course, such records bear little resemblance to the visual images that they carry. As has been mentioned, by employing cathode-ray beam spot light flux for recording and for readout I am able to effect inertialess stop and start of these records. Records thus initially produced can be duplicated by employing photographically-produced printing matrixes for imbibition printing with dyes or inks and suitable mordants.

The records for this invention can also be reproduced for duplication by the means disclosed in my "Electronic Motion Picture Printer" patents, No. 2,912,487 issued November 10, 1959, and No. 2,947,810, issued August 2, 1960.

My system is suitable for either black and white recording or for color recording. In the former case one set of records is recorded. In the latter case the edge information is recorded only once but the tonal information now becomes color tonal information. This information is recorded in two areas on the record and is read out with three area discrimination to obtain luminance information and the two required matrixed color coefficients.

An object of my invention is to provide means for fixed storage of image information devoid of redundancy.

Another object is to provide a compact and inexpensive record of a field of view.

Another object is to reduce redundancy in a video record in two ways, one related to a small fraction of a complete scansion of the field of view and another related to a complete scansion of the field of view.

Another object is to reduce redundancy in a video record by altering the velocity of the transverse scan thereof in proportion to the detail required of that scan.

Another object is to reduce redundancy in a video record by altering the longitudinal velocity of the record through the recording apparatus.

Another object is to reduce redundancy in a video record by stopping the same and inhibiting recordation in encoding and by stopping the same and rescanning in decoding when successive scansions of the field of view are identical.

Another object is to employ multiplexing of video information by forming separate sub-records which occupy reduced ranges of frequency to accomplish reduction of redundancy.

Another object is to obtain the equivalent of instantaneous stopping and starting of a video record by appropriate colinear motion of the beam scanning the same.

Another object is to employ velocity change to effect space compression both with respect to longitudinal transport and transverse scan of a record.

Another object is to generate a control track to operate apparatus for decoding image information that was encoded according to my process.

Another object is to define edges occurring in a scene recorded by switching tonal levels.

Another object is to improve the efficiency of image transmission by relating the frequency capability of the channel employed to the frequency of occurrence of edges in the image.

Other objects will become apparent upon reading the following detailed specification and upon examining the accompanying drawings, in which are set forth by way of illustration and example certain embodiments of my invention.

Figure 1:
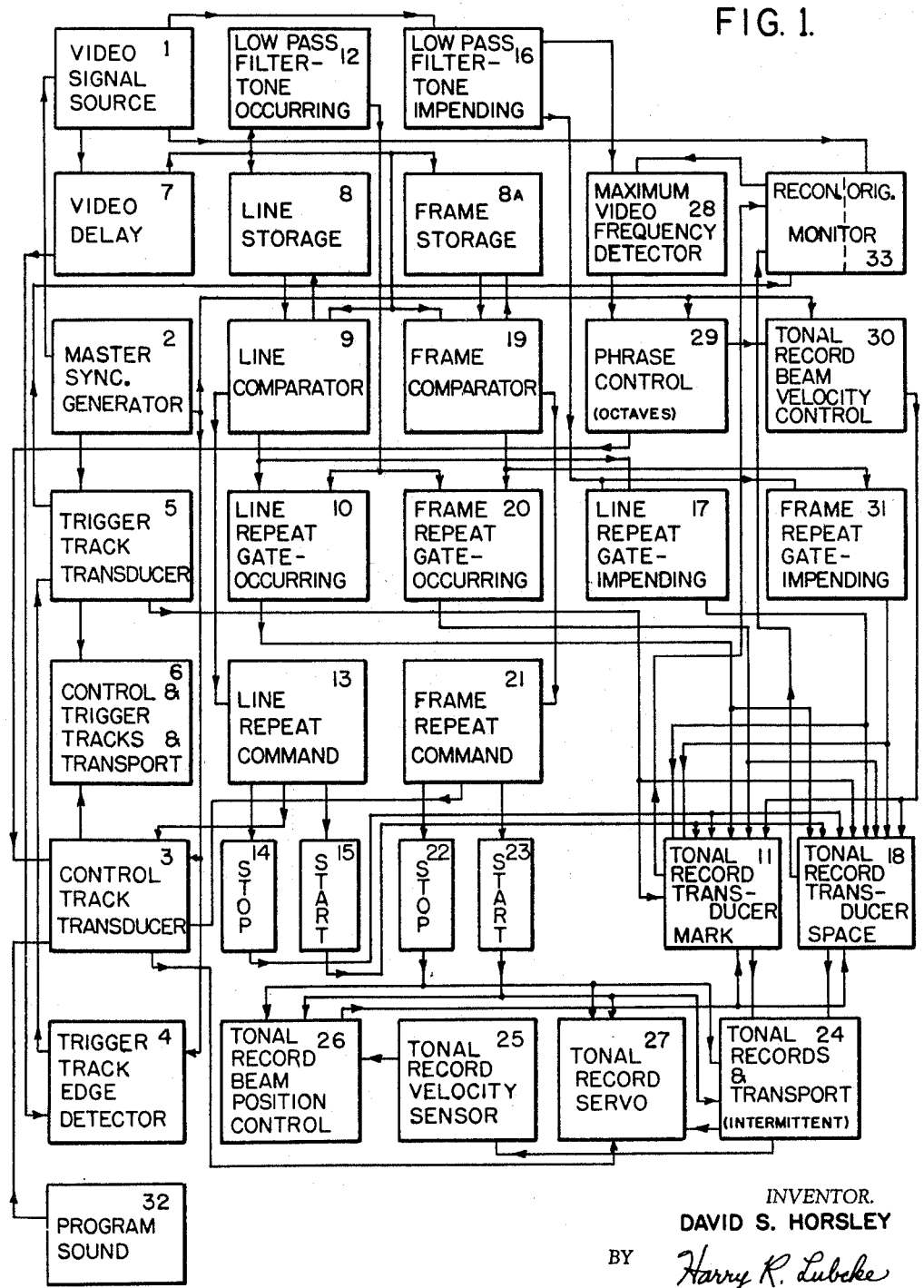
FIG. 1 shows a block diagram of my invention.
Figure 2:
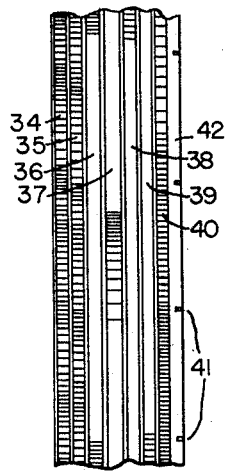
FIG. 2 shows a side elevation of a strip of the control track thereof.
Figure 4:
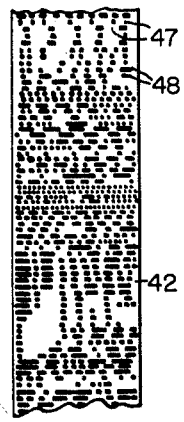
Figure 5:
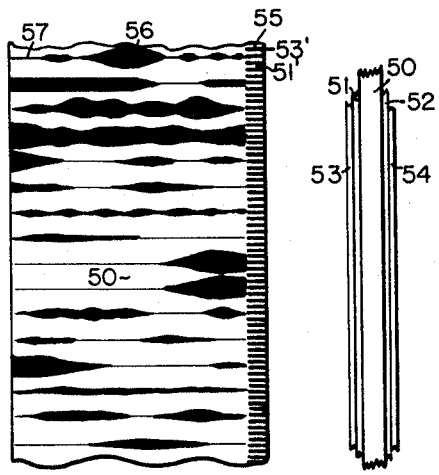
Figure 6:
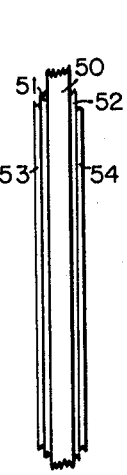
Figure 7:
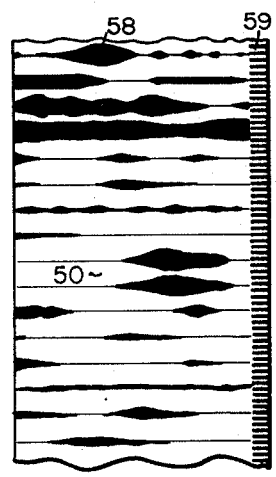
Figure 8:
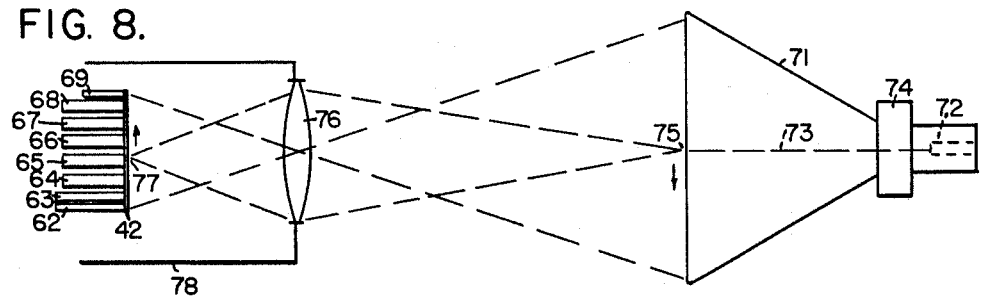
Figure 9:
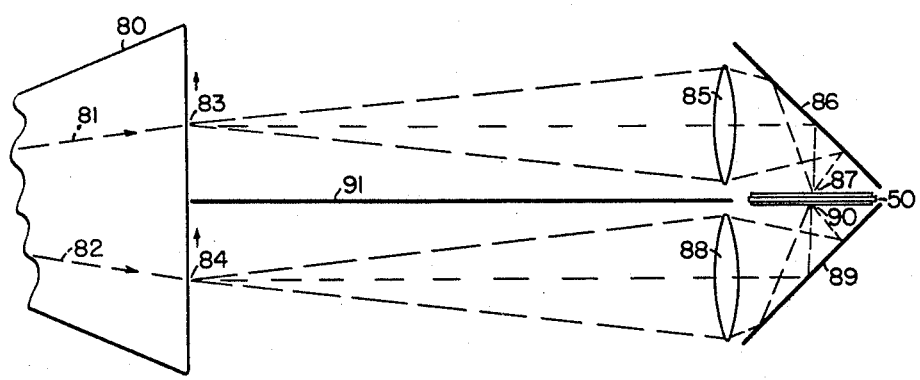
Figure 10:
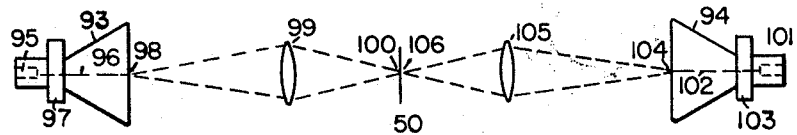

FIG. 4 shows a side elevation of a trigger track, which may be on the reverse side of the strip of FIG. 2 or which may be a separate strip, FIG. 5 shows a side elevation of a strip of the tonal record according to my invention, FIG. 6 shows an enlarged edge elevation of the same, FIG. 7 shows a side elevation of the reverse of the same strip, illustrating a second tonal record thereon, FIG. 8 shows a plan view of magnetic means to record on the control track and cathode-ray means to record on the trigger track on a combined strip containing these tracks, FIG. 9 shows a plan view of a single cathode-ray means for recording upon both sides of the tonal record, FIG. 10 shows a plan view of a double cathode-ray tube means for recording upon both sides of the tonal record, FIG. 11 is a schematic circuit diagram of the line comparator block 9 and the line repeat gate -occurring 10 and related entities of FIG. 1, FIG. 12 is a schematic diagram of an alternate embodiment for the comparator block 9, FIG. 13 illustrates the arrangement of phrases containing a different number of octave-related lines across a tonal record, FIG. 14 is a schematic circuit diagram for the maximum video frequency detector 28, phrase control 29 and tonal record beam velocity control 30 of FIG. 1, FIG. 15 is illustrative of the mark -space relation of the trigger track and the tonal variations from the tonal records according to my invention, FIG. 16 represents a bistable circuit of the trigger track transducer entity 5 of FIG. 1 from which the mark -space waveform is obtained, and FIG. 17 is the schematic diagram of a gating circuit employed in tonal record transducer -mark 11, tonal record transducer -space 18 and monitor 33 of FIG. 1.

In FIG. 1 video signal source 1 is a source of sequentially represented electrical information concerning a visual field of view. This may be the known television camera chain, as used for live pickup television operations. It also may be a television film camera chain or equivalent, or the film-to-electronics part of my "Electronic Motion Picture Printer," U.S. Patent No. 2,912,-487, in which latter the circuits feeding monitor tube 94 are suitable as the video signal source.

The master synchronizing generator 2 is a known piece of apparatus, being employed as an adjunct to a television camera chain to provide synchronizing and auxiliary pulses. The latter normally include driving pulses for performing scanning, blanking pulses for removing unwanted parts of the video signal and equalizing pulses for forming a sophisticated field-frame synchronizing pulse sequence.

In the present apparatus the master synchronizing generator feeds synchronizing and equalizing pulses to control track transducer 3 for inclusion in the control track of the final recording, horizontal (i.e. high frequency) pulses to the trigger track edge detector 4 to provide a time clock reference for preparing edge information, and to trigger track transducer 5 for the general control thereof. Horizontal pulses also go to phrase control 29 and tonal beam velocity control 30 for the functioning of these entities. Control from master synchronization generator also reflects into control and trigger track transport 6 to progress this track in synchronism with master synchronization.

The control and trigger track and transport entity 6 represents the tracks themselves and the mechanical transport means for the same. The control track moves at a uniform velocity as long as the recording means is in operation and also while the image is being displayed in subsequent reproducing apparatus.

The control track takes the form of a longitudinally-scanned record suited for frequency response to the order of thirty kilocycles. This track may be photographic, but preferably is magnetic in order to more easily reach the maximum frequency. It exists primarily for storing start-stop and velocity of scanning spot information to be used in reproducing the visual image from the tonal record and in an alternate embodiment for storing such information for the trigger track as well.

The sound accompanying any recorded event or performance is also carried on the control track in longitudinally scanned fashion. This is a separate sound track, or tracks. The sound signal originates at program sound block 32 and is impressed upon control track transducer 3 and thence upon the track.

In the simplified embodiment of my invention the trigger track is recorded upon the same medium as the control track, but upon a different area, or by different means, such as photographic when the control track is magnetic, and on opposite sides.

The trigger track is scanned transversely of the length of the tape and is employed to convey edge information about the image by providing switching instructions in mark -space form. By providing the reproducing apparatus with the information as to the timing of each edge, this part of my apparatus makes it possible to reconstitute the original image from only compressed tonal information in addition. When a mark is occurring upon the trigger track the mark tonal channel supplies the occurring tone. During this time the space tonal channel is being programmed to an impending tone. This continues until the trigger track accomplishes switching at the end of the mark, thus the beginning of the following space.

The transport for these tracks is of the type that has been developed for magnetic tape; namely, a supply reel, initial guide rollers, record head, capstan (drive) roller, and take-up reel. For monitoring and/or servo purposes an additional head assembly bearing upon the magnetic tracks is desirable.

In FIG. 1 control track transducer 3 contains the recording heads referred-to and also any auxiliary apparatus related thereto. Similarly, trigger track transducer 5 contains photographic means and auxiliary apparatus for recording this track. As has been mentioned, where a single tape is employed for recording both the control and the trigger tracks both transducers record on opposite sides of one tape. Where the trigger track is separately recorded so that it may be progressed intermittently for greater redundancy removal, each transducer records on a separate tape.

Delay line 7 of FIG. 1 is included so that there shall be two video signals available to constitute the "tone occurring" and the "tone impending." These are the same in content, but the tone occurring signal is delayed behind the tone impending signal so that the latter will have the new amplitude value of tone to which the edge pulse information causes a change, in readout, from one tonal track to the other.

The increment of time constituting the delay is a function of more than one variable and has a preferred value depending upon the design objectives of the particular embodiment.

It will be seen that the greater this time increment is, the lower will be the maximum frequency required to carry the tonal information. If a white picket fence is being depicted against a background that starts relatively white and progresses to a darker value and then back to a lighter value across the scene, it will be understood that the frequency required to reproduce the background would be of the order of half that of the horizontal sweep frequency, since a half-wave of background is executed during one sweep. Considering that the second harmonic is required to provide essentially repeated half-waves rather than a mere sinusoidal waveshape, twice the half-sweep frequency is required; i.e., of the order of the sweep frequency itself.

Consider also the rendition of a black and white title, or any similar scene that requires only two tones as long as it is displayed. Once the two tones are established, the tonal frequency required to maintain them is zero; i.e. D.C. If we elect to accept tonal distortion as this epoch is entered the maximum tonal frequency required is in the low kilocycle range.

In general, the tonal changes in a scene alternate from dark to light, or vice versa. Less often do these change rapidly between successive values of gray. This does happen in the "stepped gray scale" used in testing video equipment, but rarely in natural scenes and infrequently in man-made objects. The recognition of this fact is important to my method. When one of the two always available tones will very often be light and the other one dark, a change in the darkness or lightness of either is made from a datum which it already occupies. This calls for a considerably smaller amplitude change within a given interval of time, thus a less steep wavefront, thus a lower maximum frequency for transmitting the information.

In this way I reduce the randomness of the tonal information required; by pre-programming the tone impending to the appropriate level during its idling time. To the extent that the most probable tonal values vary slowly in the scene the randomness of tonal information is eliminated.

I am able, therefore, to reduce the entropy requirement of the channel in the concept of Shannon in his "Mathematical Theory of Communication," and I take the reduction in the form of reduction of bandwidth required for the tonal records. Further, I remove redundancy from the record by compressing the space used to store the tone. It is not necessary to waste tonal record space on a monotonous continuation of a given tone. The same result can be achieved with a very short record space and a slowly moving scanning spot in both the recording and the reproducing operations. The limit in this direction is a stationary spot impinging upon a tone in the record only of sufficient physically recorded length to insure that the spot impinges fully upon the desired tone. In practice this calls for a short lead-in and lead-out length to eliminate aperture distortion and to minimize practical inaccuracies. In theory I can reach essentially the ideal degree of redundancy elimination, since I trade change in scanning spot velocity for saving in record space and the ideal is the stationary tonal spot.

Broadly, however, redundancy in the character of the elemental information of the usual images in the real world, and particularly of material recorded for visual entertainment or education, is of such nature as to preclude any one means for completely reducing redundancy. As has been mentioned, the usual composition of a scene is such as to produce highly redundant areas in the upper and the lower parts thereof and consequently redundancy of many successive whole lines or of tones in these areas.

Redundancy occurring in the form of repetition of consecutive lines is eliminated in my recording apparatus by discerning such material by a storage function and comparison means and by inhibiting recording of any material that is repetitive. In display the redundancy is again required, and this is reinserted by repeatedly reading out the essential material recorded as long as necessary.

Redundancy of field or frame is similarly eliminated by storage, comparison, inhibition of recording in encoding and controlled repetition in decoding according to appropriate information from the control track.

Synchronizing and equalizing pulse information is redundant in the sense that it is completely predictable and only requires phase instruction to accomplish successful decoding. I employ a command pulse to establish each epoch with respect to real time. The sequence of synchronizing and equalizing pulses until the next phase instruction is easily accurately timed by the terminal equipment employed for decoding.

Trigger track edge detector 4 operates to provide an indication of the location of each "edge" in the image field of view as recorded. As previously defined an edge is a sharp change in contrast of a vertically disposed object in the image; such as the edge of a house, the back of a chair, the vertical part of a leaf of a tree, etc., etc.

I obtain a desired sharp pulse for each sharp change of contrast in either of two ways; by electrical differentiation or by video delay and subtraction of the delayed signal from the undelayed signal. This delay is a different one than the delay provided by entity 7 in FIG. 1, which latter has to do with the production of the tonal record, as has been explained.

Circuits for electrical differentiation are known and consist, for example, of an amplifier-isolated series-capacitor-shunt-resistor pair of elements. The capacitor has high capacitative reactance in the operating range of frequencies while the resistor has a relatively low resistance value. For this video frequency application the capacitor has a capacitance of the order of twenty micromicrofarads and the resistor a resistance of the order of ten thousand ohms. These values are chosen to give a largely unidirectional excursion of the differentiated waveform; i.e., "under" rather than "over" differentiation. It is desired that the direction of the edge change of tone be retained; i.e., that the information be retained that the excursion is from a darker to a lighter tone, or vice versa. This is required for most simple operation of the bistable circuit employed in recording the trigger track.

In producing the edge signal by delay and subtraction I prefer to delay both elements of the signal, but to delay one element more than the other. This is because all delay lines introduce some waveform distortion. When both signals involved have been delayed a reasonable amount the distortion is approximately the same and thus the difference provides essentially true edge information. Accordingly, both video signals here employed are delayed a major fraction of a microsecond and the "delayed" signal is delayed a minor fraction of a microsecond longer. Two delay lines suited to video signal delay are employed, one being electrically longer than the other. The subtractor circuit is a duplicate of the circuit of FIG. 12, in which oppositely phased signals are made to affect a single electron flux within a vacuum tube, as will be detailed subsequently with respect to this figure.

The waveform obtained from either of the above-described circuits is that shown at 221 in FIG. 16. This is the input to the device of FIG. 16. This employs a PNIIN semiconductor triode, attributed to V. Grinich and I. Hass in their paper on the switching applications of this triode, presented at the Solid State Circuits Conference, Philadelphia, February 1959 and published as paper TP-3 of the Fairchild Semiconductor Corporation, California.

The edge excursions 222, 223, etc. in waveform 221 have the direction preserved, as has been mentioned. This waveform is impressed upon base 224 of PNIIN triode 225. The emitter 226 thereof is connected to ground. The II collector 227 is connected through resistor 228 to a source of supply voltage within the range of from 15 to 70 volts, this source being indicated by terminal 229.

Waveform 233, appearing at terminal 230, from the collector, is the mark-space waveform desired. The relaxation behavior of the triode causes the "mark" 231, initiated by pulse 222, to be retained until the occurrence of pulse 223, which then initiates "space" 232, and so on.

It will be understood that should a minor off-axis edge occur, an "abnormal" edge, this would follow a normal pulse that had the same polarity. The semiconductor triode would not respond to this second edge, since it requires a pulse in the opposite polarity to "turn itself off." In this way I eliminate such edges and obtain a greater degree of redundancy removal.

The principal use for mark-space waveform 233 is for modulating the electron stream 73 of cathode-ray tube 71 of FIG. 8 so that the required permanent record will be made for the trigger track as at 47 and 48 of FIG. 4. Additionally, this waveform is also utilized for switching to transpose between delayed and undelayed video in mark-space transducers 11 and 18 of FIG. 1. Further, waveform 233 is used to alternate the tonal input to monitor 33 of FIG. 1 to constantly provide the "occurring" signal. This provides an easily obtained sample display of the processed output that is subsequently used in the display apparatus (not a part of this invention). In order to faithfully represent the reconstructed display image, monitor 33 has a filter, the characteristic of which corresponds to the scanning loss in recording and reproducing from the tonal records.

As technologically detailed later I prefer to record the "marks" and the "spaces" of the trigger track in relatively sharply bounded areas upon that track. This is because this operation occurs wholly at the recording terminal apparatus and the matter of frequency bandwidth of the channel required to transmit this information is not involved.

However, the important aspect of information to be retrieved at the reproducer is each axis crossing of the trigger track waveform. These crossings are employed in reconstituting the image by separation from any of the other properties of the waveform by a double-diode gate which passes only electrical energy at and very near the axis.

As a consequence, it is not necessary to preserve the rectangular waveshape of this track when a matter of transmission over electrical communication channels is involved. If information from the trigger track is thus transmitted it is only necessary to provide a communication channel having a bandwidth sufficient to pass an essentially sine waveshape in which the time integrity of the axis crossings is retained. Similarly, if the information for recording the marks and spaces upon the trigger track is required to be transmitted over a communication channel, the trigger track record may be one of gradual intensity change at edges between mark and space rather than an abrupt change.

Returning now more particularly to FIG. 1 and to the subject of line redundancy, line storage facilities 8 are provided. The video information of a line in the image being recorded is stored therein in a form in which it can be electronically compared with a succeeding line and a signal derived of the "yes" or "no" type as to whether the two lines have the same tonal content. The exactitude of this comparison can be made adjustable. This allows relatively high fidelity recording when the exactitude has been set to be precise and degraded but highly conservative-of-the-recording-medium type of recording when the exactitude has been purposely adjusted to lack precision. It will be appreciated that the eye will not usually discern minor variations in character of succeeding lines and so substitution of an identical line until a significant change in the video content of a line takes place has practical value.

While a number of storage devices may be employed for this function one of the most readily available is the half-tone storage tube, available commercially as the Raytheon CK7571/QK685 or the RCA 7539. The latter tube is an outgrowth of the Pensak "Graphecon." Technical information on these tubes is published in pamphlet form by each manufacturer.

In line storage entity 8 the storage tube is operated to store only one line for selected periods to a maximum storage time equal to the time required for scanning an appreciable fraction of the number of lines in a field. Whether only a single line is stored without the storage of adjacent lines, or whether the usual vertical deflection is employed in operating the storage tube is a freedom allowed in operation. In the second instance the vertical position in readout must be carefully maintained in order that the desired line be read out.

Line storage facility 8 is connected to video delay 7 in order that properly timed video information is read into the storage tube. By appropriate cut-off gating, in the case of the single line storage, succeeding lines are prevented from entering storage until the need for the particular line stored has expired and reuse of the facility is in order.

Both storage facility 8 and video delay 7 are connected to line comparator 9. The previously stored line is continuously read out of storage and is continuously compared with the contemporary video signal. This is accomplished by impressing one of these signals upon the grid of a vacuum tube and the other on the cathode thereof, each of the same video image phase. The signal applied to the cathode is arranged to have an amplitude a few times greater than the signal applied to the grid, actually approximately a ratio equal to the amplification factor of the tube. When identical video signals are impressed upon both grid and cathode no alternating current output will be present at the plate of the vacuum tube.

To the plate of the comparator tube there is connected a capacitor through a rectifier so that a charge accumulated on the capacitor is proportional to the difference between the video information between the lines compared. This charge is measured as the voltage across the capacitor at the time of the initial edge of the horizontal synchronizing pulse by a gated vacuum tube voltmeter type circuit. If there has been no change in the video information between the lines compared then no signal is created in nor passed from the vacuum tube voltmeter circuit and this is interpreted by coacting circuits to continue rereading the stored line and as a consequence to inhibit recording further lines on the tonal record.

The horizontal synchronizing pulse or energy derived from it is employed to discharge the plate capacitor to a datum level so that each line is compared with the prior one on an individual basis.

By adjusting amplitudes in these circuits the "go" or "no go" response thereof may be altered as desired. This constitutes a fidelity vs. redundancy-elimination control.

The repeat or not-repeat line recording information developed above is passed to line repeat gate -occurring 10 in FIG. 1. This is essentially a two input gate of the mutually exclusive type. The inputs are from low pass filter -tone occurring 12 or a "continue-to-inhibit-recording" signal from line comparator 9. The output is either the next line of tonal information or nothing, and is conveyed to the tonal record transducers, mark and space, 11 and 18. It is employed by one of these transducers and rejected by the other at any particular instant of time, but which is which depends upon other factors to be later explained.

Just how much of the high frequency spectrum of the initial video signal is removed by entity 12 depends upon the narrowness of frequency band desired for the tonal record channel and in a proportional way, the compactness of the tonal record. For an inexpensive record, as for instructional or juvenile purposes, the highest frequency passed may be as low as 50 kilocycles for a normally 4 megacycle video signal. Conversely, for relatively large screen entertainment the highest frequency may be ½ megacycle. Accordingly, filter 12 may be arranged to be variable in discrete steps for all-purpose apparatus, or fixed in fixed-purpose apparatus. The setting of this fidelity control is determined by inspection of the image recreated by monitor 33, in direct comparison with the original video image also displayed there at the right in the block indicating the dual monitor.

The continue-to-inhibit-recording signal from line comparator 9 is also impressed upon line repeat command entity 13. From here electrical commands go to control track transducer 3 for recording thereby and for subsequent use by the reproducing facility for properly reading the tonal records and also to tonal records transducers 11 and 18, for control of recording. The latter connection is made through stop entity 14 and start entity 15, which act upon the line scans of transducers 11 and 18, as to bias to black the electron-stream produced flying spot of the cathode-ray tube scanner therein.

In the same way as was described for low pass filter -tone occurring 12, low pass filter -tone "impending" entity 16 passes only the low video frequencies suited to delineate the tone in the reproduced image coactively with the "occurring" information.

Filter 16, however, is connected directly to video signal source 1 rather than to video delay 7. This gives the impending entity the required time lead over the occurring operation.

The output of filter 16 passes to line repeat gate -impending 17. This provides a tonal output of the next video line, or nothing, as did gate 10. This output is impressed upon tonal record transducer -mark 11 and -space 18 for recording the "impending" lines of the tonal record. Which transducer accepts one of these lines for recording at any instant depends upon mark -space waveform 233.

In an analogous manner the facilities concerned with storage of a frame of video information function to reduce redundancy in the tonal record as follows.

Frame storage facility 8a contains a half-tone type of storage tube and associated circuits as previously described with respect to line storage facility 8. However, in frame facility 8a the full two-dimensional image forming capability of the storage tube is exploited. After the writing of a single frame on the storage surface further writing is inhibited and the frame retained for as long as a "no" (difference )signal is supplied from the voltmeter circuit previously described. In the absence of such a signal each frame is wiped off after it has been completely recorded and the next one stored so that an up-to-date frame is always in storage when one is to be retained. The voltmeter circuit is contained in the frame comparator block 19 and a connection is shown passing upward therefrom to storage entity 8a to indicate this back action. The same connection and functioning occurs between corresponding line entities 9 and 8.

Frame comparator 19 has the grid cathode input comparison arrangement previously detailed with respect to the line entities, but the recycling pulse for the frame comparator is a frame pulse rather than a line pulse.

The repeat or not-repeat frame scanning information developed above is passed on to frame repeat gate -occurring 20. This gate either passes on the new and different frame required for continuing the recording of changes in the image, or it passes on nothing. The "nothing" is bias-to-black pulse to inhibit recording by the transducer beam, the tonal records transport 24 is stopped by auxiliary means and nothing more is recorded until something new occurs in the image.

The "continue-to-inhibit-recording" signal from frame comparator 19 is also impressed upon frame repeat command entity 21. From here electrical commands go to the control track transducer 3 for recording of the same on the control track and for subsequent use by the reproducing apparatus for properly reading the tonal records. Stop commands are generated in stop entity 22 and start commands in start entity 23, which are associated with frame repeat command 21. These latter commands go to tonal record and transport 24 to stop and start the longitudinal progress of the tonal records tape medium through the transport. Because stop commands usually extend over several and perhaps over hundreds of frames, a great saving in the length of the tonal records medium is realized.

In the same manner as frame repeat gate -occurring controlled the recording of whole frames upon the tone occurring sequences of the tonal records, frame repeat gate -impending 31 allows or inhibits recording of the tone impending.

Upon careful analysis, it will be noted that with each removal of a group of redundant lines the first redundant line thereof will be recorded and the first non-redundant line will not be recorded upon resumption of normal operation. This is because two similar lines must be discerned before inhibition of recording to remove redundancy can be effected. Also, two different lines must be discerned before recording can be resumed and the first different line will escape recording. Only the next succeeding line will be recorded. In practice, however, these irregularities in processing are so small as to pass unnoticed.

In a similar manner, one frame of information that is not different from the prior frame is recorded and one frame of new information that occurs at the termination of the frame redundancy removal interval is not recorded. None of the frames per se are lost, but only the information contained in the first of the non-redundant frames. Again, this single omission of information for 1/30 second cannot be discerned, even if motion is involved. With motion, edges blur and the eye has come to accept less than full clarity of presentation; both in real life and from any of the moving image mediums employed.

Should it be desired to remove the redundancy from a motion picture film, a video tape, or a similar record according to my method and apparatus the above idiosyncrasies can be eliminated by processing the original material through my system and forming the control track for the same while inhibiting all recording. The control track is then played back with a re-running of the original material. The phase of the control track is adjusted to just delete redundant material at the beginning of a removal of redundancy and to just include the first of non-redundant material at the end thereof in the recording.

For "straight through" processing, such as for live camera television pickups, where complete fidelity may be desired, additional storage means to store one frame of the material to be recorded is provided in entities 8 and 8a of FIG. 1. In this way the desired phase advance of the control function with respect to recording is arranged by forming the control track from the incoming information and recording from the stored information.

Redundancy removal is facilitated by a servo loop not specifically so labelled in FIG. 1 but existing as will be described below.

Tonal record velocity sensor 25 determines at every instant the velocity of the tonal record in entity 24. This can be accomplished by measuring the angular position and angular velocity of the main drive capstan or sprocket, but even more exactly by reading from a pre-recorded tone track. This track is preferably laid down when the tonal record stock is manufactured. It may be photographic or an ink printed track and is appropriately positioned at one side of the tonal record medium. A known light flux take-off is positioned to read this track in tonal record transport 24. When the tonal record is stationary no tone is generated. That is, the tone is at zero frequency. When the tonal record is moving at full speed the maximum frequency is generated. The track is laid down at somewhere near the maximum resolution capability of the medium so that the increase in frequency for an increase in velocity of the record will be relatively great. This gives a relatively "high" frequency for slow tonal record velocities, such as encountered when the record is started and stopped, thus a usefully precise index of velocity according to the conditions of operation of my apparatus.

The tonal record beam position control 26 takes information from tonal record velocity sensor 25, field stop entity 22 and field start entity 23. It provides an output giving the vertical position of the beams to tonal record transducers 11 and 18. The functioning involves the following considerations.

Control 26 accomplishes the effect of instantaneous start and stop of the tonal record medium by giving the transducer beams a motion opposite to the direction of travel of the tonal record when a start is to be made and in the direction of motion when there is a stop. Between starts and stops the transducer beams are slowly moved back to normal scanning positions according to a determinable regimen.

This is accomplished by virtue of a charge upon a capacitor. From the tonal record velocity sensor 25 under normal velocity of the tonal record a rectified electrical energy magnitude is obtained by rectification of the tone produced from the prerecorded tone track. This is applied to the capacitor in combination with a fixed potential from a plate supply through a resistor. A particular potential exists at the ungrounded terminal of the capacitor for operation at normal velocity of the tonal record and this corresponds to the central recording position for the beams in tonal record transducers 11 and 18. These beams are preferably cathode-ray electron beams, since these are easily controlled in vertical position by impressing the potential of the capacitor upon vertical electrostatic deflection plates in that type of cathode-ray tube or by direct coupling of the grid of a vacuum tube to the capacitor and by employing the current flowing in the anode circuit of that vacuum tube as deflection energy in the vertical deflection coils of a deflection yoke of a magnetically deflected type of cathode-ray tube. A similar control can also be exercised over a bidirectional galvanometer movement such as is described in United States Patent No. 2,463,785, issued March 8, 1949, in which one motion is employed to accomplish scanning and the second motion to accomplish vertical positioning.

When the tonal record slows down in the process of obeying a command to stop from stop entity 22 there are fewer pulses per second received from the tone track on the tonal record. Since each of the transitions across the axis is the pulse shape employed to affect the charge on the capacitor after rectification, each has approximately the same energy content. Being repeated less rapidly, the alteration of the potential of the capacitor away from that determined by the constant potential connected thereto through the resistor is less and the potential of the capacitor changes accordingly. This takes care of the stop functioning.

Upon a start command being given the same capacitor is simultaneously given a pulse from start entity 23 in the direction of electrical polarity to oppose the resting condition. The amplitude of this pulse and its energy content is sufficient to give vertical deflection of the scanning beams over the tonal records equivalent to full translational velocity of the record medium although the medium be just accelerating from a stationary position. The shape of this pulse is rounded by a relatively small shunt capacitor in order that this motion is still supplied as the record medium accelerates but at a lower rate so that the two motions are supplementary and in the sum equal to normal fully velocity of the medium. The pulse shape tapers off to nothing as the medium approaches full velocity.

A separate tonal transport-control track servo loop is provided in the operation of the tonal record servo block 27 in FIG. 1.

From control track transducer 3 a readout of control track tone is conveyed to block 27. This tone is standardized with pulses from master sync. generator 2. The previously mentioned tone track generated in tonal record transport 24 is compared with the control track tone in servo block 27 and an error signal developed for correcting the tonal record velocity to that of the control track by known servo control means. This servo is included so that the recording on the tonal records and on the control track will be accurately in step. In reproduction it is then only necessary to keep the reproducing elements in proper synchronism for suitable results. When the trigger track is integral with the control track the former is also kept in step.

A further alteration of the functioning of the tonal record to reduce redundancy has to do with the maximum video frequency detector 28, phrase control 29 and tonal record beam velocity control 30.

Maximum video frequency detector 28 is connected to low pass filter-tone impending 16 and through an isolating stage differentiates this tonal information signal. Connection is made with this undelayed signal to allow time for establishing an octave relationship prior to the execution thereof on the delayed signal from video delay 7 via low pass filter -tone occurring 12. Since the derivative thus obtained is proportional to the rate of change of the video signal; i.e., the steepness of the wavefronts of the tonal information, the derivative is a measure of the rapidity of change of the signal that must be recorded on the tonal records.

This derivative signal, again isolated by an amplifying stage, is then integrated to provide a control signal having an essentially uniform value for the period of time of one line of the television image. This takes place in phrase control 29 of FIG. 1. An octave submultiple relation is established, the velocity being ½, ¼, ⅛, etc. of normal tonal recording velocity for the particular line or group of lines acted upon.

The start of each horizontal recording scansion in tonal record transducers 11 and 13 is initiated by a pulse from master sync. generator 2 that is impressed upon phrase control 29 and beam velocity control 30, but the velocity with which it is executed depends upon the integrated control in the manner referred to. Accordingly, when high tonal frequencies are present because of numerous variations of tone along the line, the sweep of the beam across the tonal record is rapid and a trace is recorded across the whole of the tonal record, as seen at 240 in FIG. 13. When such variations of tone are few and gradual, as for a blank sky, or for clouds in a sky, the velocity of sweep is slow, such as the first of a group of ⅛ sub-octave traces 241 shown on the bottom line of FIG. 13. It is usual that sub-octave lines of scan occur in groups. Thus the lower illustrative line in FIG. 13 would be filled with eight lines of tonal trace.

Similarly, were the field of another part of the picture somewhat more detailed from a tonal viewpoint, there might be four lines of scan recorded on the tonal records across a given full width thereof, as shown at 242. Still further in this direction, only two scans may be made, as at 243.

FIG. 13 contains illustrative samples only. In practical operation the change from one sub-octave relationship to another is usually gradual, so that a number of lines of a given sub-octave recording will be laid down upon the tonal records in a group. When the sub-octave relation changes the traces are brought back to the initial (left) side of the tonal records in order that there is always sufficient space for completing any line trace started.

In the manner that has been explained tonal record beam velocity control 30 and associated apparatus regulates the velocity of scanning across the tonal records in the recording process. I necessarily further provide means to cue the reading of these records in the reproducing apparatus according to the proper octave velocity.

This is also accomplished by phrase control 29, which is connected to and delivers an output to control track transducer 3, from which a track is impressed upon the control track in entity 6 of FIG. 1.

A tone in approximately the audio frequency spectrum is produced which has a characteristic tone for each octave velocity. For example, a tone of a few hundred cycles controls the reproducing apparatus to provide the ⅛ octave scanning speed, while a tone of a few thousand cycles provides the full width tonal scan and intermediate frequencies the ½ and ¼ octave relationships. This is for the tonal records scanning only; the scanning for reproducing the final image for visual display is of constant horizontal frequency and amplitude, as in usual television practice.

FIG. 2 shows the control track side of a tape 42. This tape is moved longitudinally in entity 6 of FIG. 1 at a uniform rate. The base material 42 may be the known Mylar polyester of the order of 0.001″ thick by either ¼″ or ½″ wide. The width is determined by the degree of miniaturization desired in the heads required to record and read-out the information. The known 0.0015″ thick so-called plastic base tape may also be employed in lieu of the thinner Mylar tape, in which case the volume occupied by any given recording is merely larger.

In FIG. 2, tracks 34 and 35 are recorded stereophonic sound, such as dialogue, commentary, background music, etc. This sound is handled in entity 32 of FIG. 1. For monaural sound only one track is required.

Track 36 is the line repeat start track. The presence of a recorded tone on this track trips a tonal record start switch in the reproducing apparatus. This causes the reproducing cathode-ray tube flying spot reader in the reproducing apparatus to retrace a given line on the tonal record rather than to continue to progressively scan that record. This calls for vertical deflection of the flying spot for a period of time sufficient to allow continued reading of the one line although the tonal record continues to move at a relatively normal rate.

Track 37 is the line repeat stop track. That is, upon a tone of selected frequency upon this track the flying spot in the reproducing apparatus discontinues a retrace mode and continues to scan the tonal record line after line in a progressive manner. Vertical recovery to the normal position of the tonal record scanning spot is accomplished by varying this tone.

In an analogous manner, track 38 is the frame repeat start track. Upon the existence of a tone upon this track tonal transport 24 is stopped as quickly as possible and the raster of the flying spot reproducer given a longitudinal-of-the-tape forward component suited to instantaneously stop the tonal record medium as has been explained. The flying spot then executes a television-like frame raster traverse over the stopped tonal records.

As soon as this repetition of the whole television frame is to be discontinued so that different frames are presented in the display, a tone upon the field repeat stop track 39 is caused to occur. This also causes a longitudinal translation of the reading spot to occur so that the start of progressive scanning over the tonal record is immediate, although the physical record medium requires time to accelerate.

Track 40 is the phrase frequency control which determines what octave shall be employed by the reading tonal beams in reading the tonal records. The information for this track is obtained from phrase control 29, as has been explained.

Index marks 41, along the right edge of control track strip 42 are cut with a precise grinding wheel at the time the tape is manufactured and remove only the magnetic oxide medium. These are accurately spaced and form an index of the tape speed. The recurrent pulses produced in a reading head bearing upon the control track by these absences of magnetic material are servoed with the transport of the tonal record for determining the proper speed of the latter and with the scanning of the final display image to secure synchronism at the field or frame rate.

Figure 3:
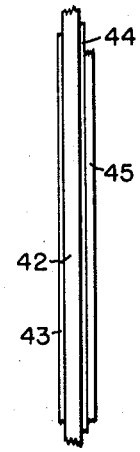
FIG. 3 shows an enlarged edge elevation of the same.

An edge view of the combined type control and trigger track tape embodiment is shown in FIG. 3. The central base material is shown at 42. Upon the control track side, a layer 43 of magnetizable material provides the medium upon which the several tracks described above are written. Upon the opposite side of the base material an inner layer of aluminum 44 is provided. This is deposited by vacuum evaporation or by an equivalent process so as to be thin and highly reflective. The necessary technique is known in the art of the suppliers of such tape material and is merely the known techniques mentioned adapted for continuous application to tape. Over the aluminum, or an equivalent reflective surface, I provide a layer of photographic emulsion 45, which is preferably of the high contrast and high resolution type. These two layers allow the trigger track to be recorded by a photographic process. This allows both sides of a given tape material to be employed for different records by having different kinds of recording on opposite sides.

The appearance of a typical trigger track record is illustrated in FIG. 4. As has been previously described a representation of the location of each edge of the image is contained upon this track. These are recorded upon the track by passing the unexposed tape past a flying spot of light that scans across the tape. The spot intensity is altered between the limits of maximum or zero at each location of an edge, thus forming the mark-space pattern upon this record.

The photographic emulsion is subsequently developed. Where the black exposure of silver of a mark occurs the track is highly absorbative of incident light employed to read out the information. Where there has not been an exposure of the photographic emulsion it is clear to represent a space and so the reflective layer below returns a large amount of the incident light. The intensity of the flying spot of light per se is maintained constant, thus a readout of the mark-space track is obtained. In FIG. 4 the spaces are indicated at 47 and the (black) marks at 48. This mode of representation can be reversed, of course, by altering the on-off program of the exposing spot of light and/or reversing the phase electrically of the read-out apparatus.

One side of the tonal record is illustrated in FIG. 5. The scale of the drawing of this record is twice that of the tape 42. There is no reason why the width of the record should bear any specific ratio to the width of the tape, since each may be determined on the basis of desired signal to noise ratio, convenient standards in transport apparatus for the same, or other considerations. In the drawings the larger scale for the record was used to show the detail thereof more clearly.

The base material in FIG. 5 is represented at 50 and again is 0.001" thick Mylar of ¼", ½" or more in width. As shown in FIG. 6, this base is flanked on both sides by a reflective coating 51, 52, of aluminum or equivalent, and these coatings are surmounted by photographic emulsions 53 and 54, respectively. In the quantity production of duplicates imbibed ink or dye impressions may take the place of the photographic material.

In FIG. 5 a track 55 is to be noted down the right side of the record, consisting of closely packed dark photographic emulsion areas 53' and alternate reflective areas 51'. These form the frequency-producing track employed with respect to entities 24, 25 and 27, as has been described in connection with FIG. 1. The track 55 is preferably pre-recorded and made visible by the tape manufacturer so as to be available for the control of the tonal records speed and position in the recording as well as the reproducing processes.

In FIG. 5 illustrative tonal values are shown in the variable area mode of recording. The more completely black the record over the fixed size of elemental scanning area, as at 56, the darker the tonal value is at that part of the image. The reverse is true when the scanning spot reaches point 57, where the exposing scanning spot is very small in size and where the reproducing scanning spot of fixed size is largely reflected rather than absorbed.

The opposite side of the tonal record is shown in FIG. 7. It will be noted that the phase of the trace on this side of the record is not the same as on the side of FIG. 5. The wide point 58 is not in the same lateral position as was point 56 on the opposite side. This is because of the "tone occurring" and "tone impending" interplay on the record between adjacent edges in the image as defined in the mark-space sequence. An additional and supplementary track 59 is also shown in FIG. 7, which is the equivalent of track 55 of FIG. 5. The tonal records can be controlled from one such track.

It will be understood that a variable density tonal record may be employed instead of the variable area type illustrated. In the variable density type the trace 56-57 remains the same width as at 56, but the blackness of the developed photographic emulsion is much less at 57 than at 56.

The relation of the mark-space trigger track, the variations of tone of the tonal records and the reconstituted image waveform for display of the reconstituted image upon a cathode-ray viewing tube is set forth in FIG. 15.

Line 250 represents the A.C. axis of the signal and also the time axis of the waveform. A fragment of one scanning line of the image has been shown. I do not necessarily restrict axis 250 to a horizontal straight line in all of the variations the video information may take according to the scene being transmitted. The circuits involved are arranged for the analysis of the image to allow a degree of curvature of the axis in order that suitable edge information will be obtained. That is, significant edges are not immediately omitted because of a gradual departure of important video subject matter from a long time integrated norm.

In order to show the relation of the mark-space waveform 233 of FIG. 16 to the total waveform 251 of FIG. 15 the latter has been drawn to the example of the former.

The ordinate of the graph of FIG. 15 represents the video voltage upon the display cathode-ray tube and follows the path 252, 253, 254, 255 . . . 264. Excursion 252 is executed rapidly vertically, in a fraction of a microsecond, and represents an "edge" in the scene, say the side of a small house that has tonal changes 253 following the edge because of variation of illumination over the side of the house. Excursion 254 represents the end of the delineation of the house and a return to a tone representing, say, a dark green lawn adjacent to the house. Tonal trace 255 represents the variation of the tone of the lawn and sharp excursion 256 the incidence of another light object in the scene, and so on.

The edge excursions are triggered in the display terminal equipment by the scanning of the trigger track. Thus, sharp delineation can be accomplished without employing the high video frequencies required for such sharpness having been recorded in the recording process, or transmitted over any channel of communication that may have been employed to transmit the records from one point to another.

The tonal excursion 253 was recorded on one side of the tonal record, the "mark" side, by tonal record transducer-mark 11 of FIG. 1, while the tonal excursion 255 was recorded on the opposite or "space" side of the same record by tonal record transducer -space 18.

On the trigger track of FIG. 4, mark 266 of FIG. 15 is represented as one of the marks 48, while space 267 is represented as one of the spaces 47.

FIG. 8 illustrates how the control and trigger tracks are recorded upon a single tape medium. At the left side of tape 42 are aligned a number of magnetic recording heads, of which 62 and 63 are for the stereophonic sound recording tracks 34, 35 of FIG. 2. Above these, in order, are found the heads; 64 for recording the line repeat start track 36, 65 for the line repeat stop track 37, 66 for the frame repeat start track 38, 67 for the frame repeat stop track 39, 68 for the phrase frequency control track 40, and head 69 to produce an output from the prerecorded edge notches 41 of FIG. 2. Since only one side of the medium 42 is occupied by magnetic tracks these tracks may be recorded in any of the known ways of magnetic recording.

The apparatus to the right of the medium 42 in FIG. 8 optically records the trigger track. This apparatus consists of flying spot cathode-ray tube 71, having an electron gun 72 that produces electron stream 73. This is deflected from side to side of the tape medium 42 by deflection yoke 74 and a spot of light is produced at 75 on a known fluoroescent screen. FIG. 8 is a plan view. Spot 75 passes in the direction of the arrow with a rapid return according to the known sawtooth waveform. Converging lens 76 focuses a reduced size image of spot 75 on the emulsion side of tape 42 in spot 77. Since a photographic emulsion is being exposed a suitable light-tight enclosure 78 is schematically shown.

Tape 42 is moved longitudinally at uniform velocity by known drive means (not shown) at a rate of the order of 15″ per second. The intensity of electron stream 73 is controlled by impressing the mark -space signal of the trigger track upon the control element of gun 72 to accomplish the mark -space recording desired.

A similar optical system is employed for exposing the tonal records. This is shown in plan in FIG. 9 and is a duplicate arrangement because both sides of tonal record medium 50 must be exposed.

A cathode-ray tube 80, shown in part, is of the same type as prior tube 71, save that tube 80 has two guns that form two electron streams 81, 82. These are independently controlled as to cross-sectional size, but are deflected by a common magnetic yoke, similar to yoke 74, but not shown. Two spots of light are formed upon the fluorescent screen, spot 83 having at every instant of time a size corresponding to mark signal in transducer 11, and spot 84 a size corresponding to the space signal in transducer 18. In fact, the apparatus of FIG. 9 comprises the transducers per se of entities 11 and 18 of FIG. 1.

The light from spot 83 is collected by positive lens 85 and is altered in direction by 90° by first-surface mirror 86. This light impinges upon the (upper) emulsion of medium 50 in a spot of reduced diameter 87. In an equivalent manner the light from second spot 84 is collected by lens 88, altered in direction by element 89 and focussed on the (lower) emulsion of medium 50 in spot 90. This system is also protected from ambient light by conventional enclosing means and the two optical systems are separated by an opaque divider 91.

The size of each spot may easily be altered by operating the cathode-ray tube in the "blooming" region of its characteristic. The intensity of exposure is maintained at the full black desired for a variable area record by operating the cathode-ray tube with a minimum light intensity of spot greater than the saturation exposure for the emulsions 53 and 54 (FIG. 6).

With the variable density tonal records previously described the intensities of spots 83 and 84 are changed with the modulating signal while the sizes of the spots remain the same. This is according to the more usual manner of operating a cathode-ray tube, as for image display as an example.

FIG. 10 shows a plan view of an alternate way of recording the tonal records in which two flying-spot cathode-ray tubes 93 and 94 are employed instead of the one double-beam cathode-ray tube 80 of FIG. 9. Having the same general arrangement as cathode-ray tube 71 for the trigger track previously described, the present cathode-ray tube 93 has electron gun 95 forming a single electron stream 96, which is deflected by deflection yoke 97 to form a linear traverse and a rapid return movement of light spot 98. By means of positive converging lens 99 a spot 100 is formed on the left hand side of the tonal record medium 50.

In an equivalent manner and synchronously operative, tube 94 has gun 101 which forms electron stream 102, being deflected by yoke 103, forming light spot 104, with lens 105 focussing spot of light 106 on tonal medium 50 on the side opposite to previously mentioned light spot 100.

The control electrode of gun 95 is connected to the mark signal and the control electrode of gun 101 to the space signal output. Equivalent deflection yokes 97 and 103 are connected to a single source of sawtooth deflection energy (in series or in parallel according to preferred technique) for congruent deflection across the record medium 50.

In both FIGS. 9 and 10 and in FIG. 8 when a separate stop and go trigger track is employed, the deflection means include coils to produce deflection of the electron streams in the direction of the longitudinal motion of the record mediums involved. These coils are suitably energized to accomplish the instantaneous stop and go recording by longitudinal deflection, as has been explained.

The apparatus of FIG. 10 is also enclosed in a light-tight enclosure as mentioned earlier in connection with FIGS. 8 and 9. As in FIG. 9, the spot sizes in FIG. 10 are made to vary for variable tonal recording and the spot intensities to vary for variable density recording.

FIG. 11 details the line comparator block 9 and the line repeat gate -occurring 10 of FIG. 1. These circuit details also apply to line repeat gate -impending 17, and with minor and understandable revisions of the component values for frame rather than line frequency these details also apply to frame comparator 19, frame repeat gate -occcurring 20, and frame repeat gate -impending 31.

In FIG. 11, input 110 is from line storage 8 and input 111 is from video delay 7, both of FIG. 1. These are both delayed video signals and are in phase both as to time and as to image polarity of television signal. All normal video frequencies are present, but fidelity is not important because the signals are employed to produce switching outputs, not to produce video information for recording or display.

Amplifier "A" 112, is a conventional amplifier devoid of phase reversal and having a low output impedance, of which a cathode-follower stage is exemplary. Triode vacuum tube 113 is the comparator tube. A video signal having an amplitude "$s$" arriving from terminal 110 is impressed upon the control grid of tube 113. An otherwise idential signal from amplifier 112 and having an amplitude "$s_1$" is impressed upon the cathode of tube 113. The amplitude of $s_1$ differs from that of $s$ as may be required to give zero plate current change from imputs that are otherwise identical.

As was previously mentioned in connection with the block diagram of FIG. 1, the output from this tube is zero if both of the input signals are the same; i.e., if the line of video information occurring is the same as that which was stored. In FIG. 11, if this is true at any particular time in the repeated scanning of the lines constituting an image, the alternating current output at the plate, point "$x$," will be zero. If this is not true, there will be an alternating current signal there that represents the difference between the video amplitudes along the two lines involved.

For the purpose of explaining the functioning of the apparatus of FIG. 11 it will be assumed that the two lines being compared are not the same and that an alternating current signal does appear at "x." This signal is passed by capacitor 114. Diode 115 is connected to this capacitor and resistor 116 completes the diode circuit to ground (or to specific bias means, not shown). Capacitor 117 is connected in shunt between the diode and ground and is used to accumulate a charge proportional to the signal passed at point "x." With the polarity of the diode shown, a negative charge is collected.

Resistor 118 has a relatively high resistance, so as not to discharge capacitor 117 an appreciable amount during the period of one line. At lead 119 this resistor is connected to master sync. generator 2 to provide a source of line blanking signals of positive polarity. This provides a positive pulse to neutralize the negative charge upon capacitor 117 and so to fully discharge the same, or to discharge it to a relatively low and constant datum level, preparatory to having the function repeat for the next line.

The double triode section following and generally designated as 120 is a gate circuit that gives a pulse of fixed energy content when a negative voltage threshold is exceeded at its input and does not give an output when this threshold is not exceeded.

Capacitor 121 is connected to resistor 118 and to capacitor 117 and is merely an isolation coupling capacitor. Potentiometer 122 is connected thereto and serves as an adjustable threshold control, determining whether or not a given line will be repeated. The cathodes of triodes 123 and 124 are connected together and through series resistors 125 and 126 to ground. The plate of triode 123 is connected through plate resistor 127 to the usual plate voltage supply, of, say, 200 volts. Through coupling capacitor 128 the signal output of the triode 123 is impressed upon the grid of triode 124. Resistor 129 also connects to this grid and at the opposite end to a negative line blanking signal from master sync. generator 2 of FIG. 1. The blanking signal is the enabling signal to cause the gate circuit to give an output pulse or not, according to the charge that developed on capacitor 117.

Since this output is a negative voltage pulse, amplifier 130 is employed to reverse this to a positive pulse. Triode 131 is a vacuum tube voltmeter type circuit. In addition to the potentiometer 122 previously mentioned the negative bias at terminal 132 may be adjusted (by known means not shown) to provide a fidelity vs. redundancy-removal control. A plate resistor 133 is connected to the plate of triode 131 and also to a source of plate excitation D.C. voltage, as usual. From the plate is taken a negative pulse at lead 134. This is the actuating pulse for the line repeat command entity 13 of FIG. 1.

This same negative pulse is passed to amplifier 135 for the purpose of increasing the amplitude of the same and particularly to clip the dwell axis at a uniform amplitude. This signal is then impressed upon the screen (second) grid of pentode 136 and acts as an "enabling signal," i.e., when present the signal impressed upon the inner or control grid is passed, when absent the tube is cut off and nothing passes. The cathode of tube 136 is provided with a normal bias by the RC combination 137. An input from low pass filter -tone occurring entity 12 in FIG. 1 is impressed through coupling capacitor 138 and grid return resistor 139 to the control grid of tube 136. When the enabling signal is present, meaning that there has been a significant difference between the last two lines, the next line is allowed to pass, and the repeat mode of non-recording on the tonal records is terminated. The passed tonal signal appears at the plate of pentode 136, over plate resistor 140 and at terminal 141, which terminal connects to the tonal record transducers 11 and 18 to supply the tone occurring. Resistor 142 is the usual screen-dropping resistor and having a larger ohmage value than normal so that the tube is cut-off save when the enabling signal is present. The latter arrives through capacitor 143.

An alternate circuit arrangement for the comparator tube of FIG. 11 is shown in FIG. 12. In FIG. 12, terminal 145 connects to the output of line storage tube 8 and through usual coupling capacitor 146 and grid return resistor 147 to the control grid of pentode vacuum tube 148.

Terminal 149 connects to amplifier 150 in FIG. 12 and to video delay 7 of FIG. 1 as a signal source. The amplifier is constituted of one stage, say, and acts to reverse the phase of the video image signal and to amplify the signal "n" times; "n" being the ratio between the control function of the control grid and the screen grid in accomplishing a given signal output at the plate of the tube. Thus, the signal on the control grid has a positive image polarity and an amplitude of "s," while the signal on the screen grid has a negative image polarity and an amplitude of "ns." This arrangement suppresses any signal output at the plate of tube 148 if each of the input signals were exactly the same in all particulars for the two lines compared.

A normal cathode bias is provided by RC elements 151. Plate resistor 152 performs the usual function and the useful output is available at the plate lead "x." In order for the alternate of FIG. 12 to replace the first part of the apparatus of FIG. 11, all of the latter to the left of "x" is removed and the apparatus to the left of "x" in FIG. 12 substituted.

FIG. 14 gives the circuit details for the following entities of FIG. 1; maximum video frequency detector 28, phrase control 29 and tonal record beam velocity control 30. This sequence of apparatus determines, in an octave relation, how many lines in a phrase shall occupy a line of scan across the tonal records. This is determined in relation to need; i.e., the most rapid changes of tonal values requires the greatest length of line trace.

In FIG. 14 terminal 166 represents a connection to low pass filter per se 16, of undelayed tonal information, in FIG. 1. To this terminal is also connected, through a suitable isolation stage, the reconstituted tonal information of both mark and space tonal records as supplied to the reconstituted image circuits of monitor 33.

Referring to FIG. 15 for a moment, while mark tonal information at 253 is being recorded, the space tonal channel is taking the amplitude level of succeeding space tone 255. This occurs because the mark tone 253 has been delayed by video delay 7 sufficiently to allow impending tonal information to be readjusted to the space tonal level indicated as 255 by the time edge 254 arrives and the switching action from the mark tonal information to the space information must take place. The speed with which these new tonal levels can be arrived at is limited by the frequency response of the tonal channels, a response purposely made as low as possible to provide a compact tonal recording.

This response may be adjusted so as to accommodate all changes in tonal level and thus to prevent even residual tonal distortion. However, if the objective is maximum compactness the response can be adjusted so that there will be a certain portion of rapid tonal changes that cannot be executed in the time allowed before the next edge switch must occur. In such instances there occurs an amplitude discrepancy between the level required at the instant of switching and the amplitude actually attained by the channel switched in. This causes the most rapid change of amplitude to persist in this channel and thus the highest frequency component to be present therein for a brief period of time until the adjustment is completed. Such a condition occurs when the interval just concluded is brief, such as the mark tonal trace 261 and the change in amplitude required of the space channel is considerable, as from the last of trace 259 to the beginning of trace 263.

Accordingly, at terminal 166 there are present tonal frequencies over a considerable range, including the minor amplitudes of the highest frequencies passed by the tonal channel system. Capacitor 167 and inductor 168 constitute a series resonant circuit that is resonant at essentially the highest frequency passed. The flow of current from terminal 166 to ground and so through resistor 169 will be a maximum for the highest frequencies, thus emphasizing them. Across resistor 169 appears a voltage proportional to the resonant current and also to other frequency components of the tonal channels. The resistance of resistor 169 is adjusted for proper balance between these two; the lower the value thereof the greater is the response to the highest frequencies. A suitable value is in the order of tens of ohms.

Amplifier 170 is essentially non-discriminatory as to frequency within the tonal frequency range and is employed to raise the signal level to a desired medium level for further handling in the subsequent elements of the devices of FIG. 14.

Amplifier 171 is connected to the output of amplifier 170 and is a tuned amplifier responding to the highest tonal change frequency. This is much lower than the maximum frequency occurring in the original video signal. When the latter may be four megacycles the former is of the order of one-hundred kilocycles. This is because edges are formed separately and because of the two tonal tracks, which two work together in reconstituting the image in a manner that requires only half as fast a change of tonal information as would be required of a single tonal record.

Also connected in parallel with amplifier 171 across the output of amplifier 170 in FIG. 14, is tuned amplifier 172, having a response frequency half that of amplifier 171. The response bands of these amplifiers are not narrow, but only sufficiently restricted so that the passed bands do not in any way overlap. Similarly, tuned amplifier 173 has a response frequency one-fourth that of amplifier 171 and is parallel connected as before. Amplifier 174 has a response frequency one-eighth that of amplifier 171 and is also parallel connected to amplifier 170.

It will be seen that if the particular tonal material of an image has rapid tonal variations, an output will be obtained from amplifier 171. It is likely that an output will also be obtained from one or more of the lower frequency amplifiers 172, 173 and 174. However, subsequent apparatus in FIG. 14 is employed to give an output dependent upon the highest frequency involved in any particular period of time. If the tonal material of the image has gradual variations, one of the other tuned amplifiers gives the highest frequency response, for example, of $f/4$ from amplifier 173.

The response from a given line of video information having a maximum tonal change frequency of "$f$" is integrated by the RC series resistor 175 and shunt capacitor 176 connected to the output of tuned amplifier 171. Of course, if the particular line does not have any tonal changes that occur this rapidly the output from the integrating circuit will be zero. If only one or two such changes occur the output will also be zero since the integrated energy will be below the threshold of operation of subsequent apparatus, which is desirable.

At terminal 177 there is connected a line blanking pulse output from master sync. generator 2 poled to discharge capacitor 176 once per line of television scanning. Resistor 178 is included in this circuit to isolate capacitor 176 from the sync. circuit and also from other connections of this same circiut to other octave integrating circuits.

Amplifier 179 raises the level of the integrated signal in the "$f$" channel suitably to trigger a monostable circuit, such as a one-shot multivibrator, 180 upon the existence of an initial signal above threshold level in that channel.

The output from one-shot 180 is a negative pulse equal to the return time of the sawtooth from source 181 and a positive pulse for the rest of the time of that sawtooth. The latter positive pulse is of the nature of an "enabling pulse," in that a mulitple input pass means, such as a pentode, 182 is enabled to amplify if the pulse is present and is not able to amplify if the pulse is absent. This pulse is fed from the output of one-shot 180 through coupling capacitor 183 to the screen grid of pentode 182. Resistor 184 serves the double purpose of providing an impedance for the pulse to build up across to thus constitute an actuating voltage for the pentode and also as a dropping resistor to provide a minimum positive voltage at the screen grid at all times from a positive voltage supply connected at terminal 185.

This period of sawtooth source 181 ($=1/f$) is equal to the time for the execution of one television scan across the original image and the amplitude of the sawtooth is such as to sweep the recording beam, as 81 in FIG. 9, sufficiently far to produce a tonal recording all of the way across the tonal record 50 in that figure. A line frequency synchronizing pulse is introduced to source 181 at terminal 186 in order that the scansions of the tonal record are executed in synchronism with a time clock common to the system. The RC combination 187 provides the usual cathode bias for pentode 182. The suppressor grid thereof is also connected to the cathode, as is common practice. The usual plate load resistor 188 is provided between the source of plate supply voltage 185 and the plate of pentode 182.

It will be seen, then, that at the output lead 189 connected to the plate of pentode 182, there will be a fairly rapidly executed sawtooth voltage sweep if there is an output from the tuned amplifier 171 at the head of this channel and no output of any kind upon lead 189 if there is no output from amplifier 171.

Amplifier 172 heads a similar channel to that described; however, one that operates at half the frequency of the described channel. The RC integrating combination 190 is the same circuit as before but the capacitance of the capacitor is approximately twice as large as before. The further part of the channel is the same as before up to the one-shot 191. This is of the same circuitry, but of slightly different component values so that it operates at half the frequency of one-shot 180. Similarly, sawtooth sweep source 192 has a period of $2/f$; i.e., twice as long as the period of sweep 181. The amplitudes of each are the same. Thus two lines of tonal information are recorded each time the $f/2$ channel provides the sweep for the recording cathode-ray.

Sweep source 192 is similarly synchronized via terminal 193 as was source 181 at 186. Pentode 194 and associated circuits are the same as pentode 182.

It will be recognized that only one sweep frequency output can be tolerated at any one time upon output lead 189. Only one rate of sweep can occur for any line of image information as this is recorded on the tonal records. It is necessary to provide circuitry that will accomplish this exclusive type of function. This is accomplished by blocking out all lower frequency sweeps.

Amplifier 195 is connected to the output of the prior "$f$" channel one-shot 180. It accepts the same pulse output previously described from this one-shot, but it has an odd number of stages, or in other known ways, accomplishes a phase reversal of that pulse. This produces a long negative pulse during the time of the scanning of a line and thus constitutes a "disabling pulse." This pulse is applied to the screen grid of pentode 196 and the other voltages thereof are easily adjusted so that no output is obtained therefrom when it is thus disabled because of too low screen voltage.

The output of period $2/f$ from pentode 194 is phase reversed by amplifier 197 and is applied to the control grid of pentode 196. If there is an output from the "$f$" channel the "f" one-shot 180 operates and so pentode 196 in the f/2 channel is cut off. This is for the reasons previously set forth. The converse condition may also take place, of course; if there are no "f" tonal components at a particular time in an image there will not be an output from amplifier 195 because one-shot 180 is not operating and so the slower deflection from pentode 196 reaches lead 189 and so output terminal 198.

According to the pattern that the reader can now see as having been developed, electrical output at and around frequency f/4 from tuned amplifier 173 is integrated by elements 199 and actuates one-shot 200 when the integrated output is above the threshold for the one-shot. A suitably synchronized sweep source 201 has a period of 4/f. As before, it runs continuously but is gated out only when one-shot 200 places an enabling pulse on the screen grid of pentode 202. Amplifier 203 phase reverses this output and applies it to the control grid of pentode 204. This pentode is a duplicate of pentode 196, being also fed a disabling pulse, or not, from amplifier 195 in the "f" channel.

However, it is necessary to inhibit output from the f/4 channel if there is an output from the f/2 channel. Accordingly, amplifier 205 is connected to one-shot 191 for the same purpose that amplifier 195 was connected to one-shot 180. Amplifier 205 is connected to the screen grid of pentode 206 and disables it if there is normal f/2 activity and output. Amplifier 207 reverses the phase of sweep between pentodes 204 and 206 as has been previously explained.

In summary, pentode 202 of the f/4 channel gates the 4/f scan through from sweep 201 if there is f/4 output. Nevertheless, that scan is inhibited by pentode 204 if there is an "f" channel output and also by pentode 206 if there is f/2 channel output.

By providing an odd number of phase-reversing amplifiers between each sweep source the phase of the sweep employed to deflect the tonal beams is always in the same direction, as it must be.

Following the above pattern, an output from tuned amplifier 174 at or about the frequency of f/8 is integrated by elements 208 and actuates a one-shot 209 of repetition frequency f/8. The time constant of elements 208 is approximately eight times that of elements 175, 176 in the "f" channel. As before, sweep source 210 produces an output of the same amplitude as all of the prior (equal) amplitudes, but the period of the sweep is 8/f, or eight times slower. This output is passed by pentode 211 when there is f/8 energy present in the image.

Also as before, this sweep output is inhibited by pentode 212 if there is "f" output and the rapid sweep is required for tonal recording. Amplifier 213 reverses the phase of the sweep between the tubes, as before. Similarly, pentode 214 inhibits the f/8 sweep if there is f/2 energy present. Amplifier 215 phase reverses. Finally, pentode 216 inhibits the f/8 sweep if f/4 energy is present. Amplifier 217 phase reverses.

If there is no higher frequency energy than f/8 in the image, as for a relatively clear sky or uniform foreground, etc., the apparatus described will place eight lines of tonal information across a single width of the tonal record. If, however, higher frequency information is present, a corresponding higher speed of recording across the record is automatically chosen.

It will be realized that the amplification of the lower frequency channels in FIG. 14 is less for each pentode and intervening amplifier stage than for "f" pentode 182, so that a uniform amplitude of output is obtained for each channel.

It will be further understood that certain of the interstage amplifiers need not be employed when economy is a factor. As shown, the relation of phase of the sawtooth signal is the same for each pentode employed. This causes the sawtooth signal to occupy the same part of the tube characteristic for each pentode. If it is immaterial that the phase of the sawtooth be inverted in some of the pentode stages, then amplifiers 203 and 207 may be eliminated in the f/4 channel and any two of amplifiers 213, 215 and 217 in the f/8 channel. It is necessary that an odd number of stages be employed between each sweep and output terminal 198, as has been explained.

Terminal 198 connects to the horizontal deflection means in both tonal record transducers 11 and 18 in FIG. 1.

FIG. 17 is the schematic diagram of a gating circuit employed as a part of the following entities in FIG. 1; tonal record transducer -mark 11, tonal record transducer -space 18, and monitor 33, reconstructive display.

The purpose of this circuit in the first two entities is to switch from tone occurring in the mark transducer 11 to tone impending information from the prior apparatus in FIG. 1 when the recording of the tone occurring has been completed, and vice versa; and similarly in the space transducer 18, but in the reverse sequence. In the monitor 33, the arrangement is such that the occurring tone information is always presented to form the display.

In FIG. 17 terminal 270 connects to incoming tonal information, occurring; i.e., from filter 12, suitably gated as to repetition from other entities of FIG. 1. Terminal 271 is analogously connected to incoming tonal information, impending. Terminal 272 is connected to a source of mark -space information, as terminal 230 of FIG. 16.

Diode 273 is connected for actuation to terminal 270 through capacitor 274 and over return path-to-ground resistor 275. Diode 273 is back-raised to non-conduction by battery 276 (or equivalent), which acts through impedance-determining resistor 277. The mark -space information from terminal 272 passes through isolating capacitor 278 and through isolating resistor 279 to the anode of diode 273 and acts as an "enabling pulse" to overcome the back bias on the diode and so to pass tonal information from terminal 270. This information passes through output coupling capacitor 280 and thence to output terminal 281 for actual recording. This situation is maintained throughout the "mark" epoch of the enabling pulse.

As soon as the mark epoch is over, the tone impending information must be recorded upon the mark tonal record so that the display apparatus to be subsequently actuated by this record will be brought to the proper level of tone when it is next to take over the active delineation of the image. Accordingly, a reversed diode 282 is employed. This is connected to the impending information through capacitor 283 and over return resistor 284. This diode is also provided with a back bias, from battery 285, which acts through impedance-determining resistor 286.

For this diode the "space" part of the waveform 233 acts as an enabling pulse, and so during the existence of each "space" diode 282 passes the impending tonal information to output terminal 281 through capacitor 287. The "space" pulse passes from terminal 272 to diode 282 through isolating capacitor 288 and isolating resistor 289.

The same circuit as given in FIG. 17 is provided for tonal record transducer -space 18 in FIG. 1, save that the connections of the tone occurring and the tone impending sources to terminals 270 and 271 are interchanged.

The same circuit is also employed in monitor 33, with the modification of connections such that the mark tonal information occurring is connected to terminal 270 and the space tonal information occurring is connected to terminal 271. That is, the phase between the information available at terminals 270 and 271 is such in relation to the phase of the enabling pulses at terminal 272 that the "occurring" information is always passed on to output terminal 281 and thus for display upon the reconstituting monitor tube in monitor 33.

Certain further variations are possible in the apparatus previously described.

While separate start and stop repeat lines tracks 36, 37 and repeat frames tracks 38, 39 have been provided on the control track of FIG. 2, it is possible to arrange for a low frequency persisting tone to sustain normal progressive scanning and a persisting high frequency tone the line or frame repeat scanning. Variations of the low tone may still accomplish subsidiary control during progressive scanning and variations of the high tone may accomplish similar control during repeat scanning. This modification eliminates two of the tracks mentioned and two of the recording heads, as 65, 67, in FIG. 8.

In any of the cathode-ray tubes electrostatic deflection means by known deflection plates may be employed. Beam focusing may be magnetic or electrostatic. A sawtooth waveshape of deflection over the trigger track and the tonal records is preferred because of lack of overlap at the ends of the scan over a triangular wave, also because of the brief interval of time between information being supplied to the individual tracks on the control track. Nevertheless a triangular wave of across and back could be employed for scanning on these records.

Instead of a PNIIN semiconductor triode as shown in FIG. 16 and as described herein, a PNPN transistor may also be employed to give the pulse to mark -space conversion of FIG. 16. The required flip-flop behavior is described in the periodical, "Semiconductor Products," vol. 4, No. 2, February 1961, p. 32, by V. A. Marsocci in his paper, "A Survey of Semiconductor Devices and Circuits in Computers."

It will be understood that in the same manner in which I compacted the tonal records in recording these at decreased velocity of the recording beam across the record medium, the edge record, i.e., trigger track, may also be compacted.

The limit in this respect in either of these records is the resolution of the recording medium and the total aperture loss occasioned by the finite size of the recording and the reproducing spots of light. With an electron beam and a phosphor screen to form the spot of light it will be noted that the matter of phosphor decay is an important factor in the aperture loss. Nevertheless, flying spot cathode-ray tubes are well known that have a resolution of 1,300 television lines.

In the trigger track that has been described, an essentially rectangular waveform of mark -space sequence has been initially and recorded. Such rectangularity is not required, either upon the record or of the waveform resulting from the read-out of the record. The positions of the edges are uniquely determined at the times where the waveform involved passes through the A.C. axis and not upon the rise or decay times of the remainder of the waveform excursions. As long as the time integrity of these axis crossings is maintained, the information as to the edges is retained. Rectangularity for ultimate display of the reproduced image is obtained by differentiating gated axis crossings and this process is not dependent upon the shape of the off-axis parts of the trigger track waveform.

Further, it is possible to accomplish space compression of the trigger track by reducing the transverse velocity of scanning the medium involved in recording. This velocity can be reduced to the point where the resolution of the medium and the effects of aperture distortion in recording and in reproducing become limiting factors, as was previously explained in connection with the tonal records.

Should this thus anamorphosed trigger track then be required to be transmitted over a communication channel, it will be seen that the capabilities of that channel would be constantly employed to full capacity and a significant economy of time of transmission would be realized. This is because real time is disregarded in my manner of encoding. The transmission over the communication channel is accomplished by reading the trigger track at a uniform velocity without regard to the time significance of the individual signals.

In decoding at the receiving terminal of the communication channel the trigger track is recorded upon a medium equivalent to the one employed at the transmitter.

In reading this track for display upon an image viewing tube the velocity of read-out is adjusted so as to read each sequence as was employed for the original recording of the trigger track at the transmitter. This recovers real time. The proper velocity of read-out is given by interpreting such information recorded on the control track.

It will be appreciated that the known thermoplastic recording process employing an electron stream incident upon a moving thermoplastic strip in a vacuum is well suited according to my method and apparatus for recording purposes.

The aspects of instantaneous stop and instantaneous start of my system by deflection of an electron stream in the direction of motion of the medium are immediately applicable to the transducer of this mode of recording in the same way that I have described.

For my trigger track the "yes-no" nature of the mark -space waveform calls for only the simplest fidelity of amplitude from the thermoplastic recording process. The tonal records can be recorded as various tones in an amplitude sense. However, the requirement for tonal fidelity can be eliminated by first modulating the tonal information on a subcarrier of a carrier frequency that is near the frequency resolution limit of the thermoplastic. The lower resulting sidebands are then recordable upon the medium and the intelligence is contained in the crossings of the axis of the recorded waveform.

In the matter of frame redundancy removal, an alternate embodiment embraces the storage of only alternate fields in storage entity 8a and a comparison therebetween in comparator 19 (FIG. 1).

When redundancy occurs the comparison of fields 1 and 3 is available prior to the time for recording field 4, which may then be eliminated at the start of a redundant sequence. Likewise, upon the end of a redundant sequence, field 4 of new information discerned in fields 3 and 4 can be recorded, rather than to wait for field 5 as would be the case for full frame-to-frame comparison. This alternate embodiment thus provides somewhat superior fidelity in depicting motion, etc. than the previously described embodiment and in accordance with the same instrumentalities there employed.

While I have indicated a precision grinding operation to place the synchronization notches 41 upon the control track (FIG. 2) it is to be understood that the same may be more economically formed by notches in the coating wheel, or by precision printing of an index by a precision printing wheel.

In FIG. 12 I have indicated vacuum tube 148 as accepting input signals upon the control grid and the screen grid. This configuration may be altered slightly to employ the 6AS6 vacuum tube in which the suppressor grid takes the place of the screen grid for dual control grid operation according to the recommendation of the vacuum tube manufacturer.

The same substitution may also be made with respect to vacuum tube 136 of FIG. 11 and vacuum tubes 182, 194, 196, 202, 204, 206, 211, 212, 214, and 216 of FIG. 14.

While I have indicated an eight octave spread in the alteration of recording (and reproducing) velocity in this system it will be understood that this spread may be extended or may be restricted as may be desired according to the particular results desired. It will also be recognized that while the octave is convenient increment interval, this interval may be greater or less than an octave according to the method and apparatus of my invention without any more than minor changes in the value of the component parts involved.

Although certain specific examples of voltages and values for circuit elements have been given in this specification to illustrate the invention, it is to be understood that these are by way of example only and that reasonably wide departures can be taken therefrom without departing from the inventive concept. Modification of the circuit elements, details of circuit connections and alteration of the coactive relation between elements as well as modifications in arrangement, size and proportions of the illustrative embodiments shown may also be taken without departing from the scope of my invention.

Having thus fully described my invention and the manner in which it is to be practiced, I claim:

1. The method of video recording which comprises the steps of
    storing a sequence of video signal,
    comparing said sequence with a subsequent equivalent sequence,
    restricting the frequency band of said video signal,
    recording non-duplicated sequences of the restricted signal,
    forming and recording a control signal identifying omissions in said recording,
    examining said video signal for the maximum frequency present during each said sequence,
    forming a recording scan having a velocity related to said maximum frequency,
    performing said recording of said restricted signal according to said scan velocity,
    detecting each rapid excursion in said video signal,
    forming an other signal for each said rapid excursion and separately recording said other signal.

2. The method of recording a video signal which comprises the steps of
    storing a sequence of video signal,
    comparing said sequence with a subsequent equivalent sequence,
    restricting the frequency band of said video signal,
    rejecting duplicated sequences of the restricted video signal,
    forming and recording a control signal identifying the occurrence of said rejected sequences,
    determining the maximum frequency present during a selected interval of said restricted signal,
    forming a recording scan having a velocity octavely related to said maximum frequency,
    recording the non-rejected sequences of said restricted signal in groups corresponding to said octave velocity relationship,
    forming and recording another control signal identifying said octave relation,
    detecting each rapid excursion of said video signal,
    forming a further signal related to the occurrence of each said rapid excursion,
    and recording said further signal.

3. The method of removing redundancy in recording a video signal which comprises the steps of
    storing a sequence of said video signal,
    comparing said sequence with a subsequent sequence occupying an equal time interval,
    restricting the maximum frequency of said video signal,
    retaining only such sequences of the restricted signal as are not duplicated,
    forming and separately recording a control signal identifying the occurrence and duration of non-retained said sequences,
    determining the highest frequency present during each line sequence of said restricted signal,
    forming a line recording scan having a velocity related to said determined highest frequency in an octave relationship,
    recording the retained sequences of said restricted signal transverse of a recording medium in groups thereacross corresponding to said octave relationship,
    forming and separately recording another control signal identifying the octave relation employed during the recording of said restricted signal,
    detecting each edge in the image represented by said video signal,
    forming an on-off signal related to the occurrence of successive edges,
    and separately recording said on-off signal.

4. The method of recording a video signal which comprises the steps of
    forming a first electrical signal corresponding to the most rapid excursions in said video signal,
    forming a second electrical signal corresponding to the less rapid excursions in said video signal occurring between two of said most rapid excursions,
    forming a third electrical signal corresponding to said less rapid excursions occurring between the second of said two most rapid excursions and the next succeeding most rapid excursion,
    alternately forming further sequences of said second and third electrical signals between further said most rapid excursions,
    delaying said second electrical signal,
    storing a sequence of said delayed electrical signal,
    comparing each successive sequence with the prior stored sequence,
    inhibiting recording of each said successive sequence when the same does not differ from the prior sequence,
    similarly storing, comparing and inhibiting recording of successive sequences of said third electrical signal,
    recording the uninhibited said second electrical signal and recording the uninhibited said third electrical signal,
    separately recording said first electrical signal,
    forming electrical control signals corresponding to periods of inhibition of said recording,
    and uninterruptedly recording said electrical control signals.

5. The method of recording video signals which comprises the steps of
    forming a first electrical signal corresponding to the location of each change in amplitude of said video signals occurring at a maximum rate,
    forming a second electrical signal corresponding to slow amplitude variations of said video signals between two of said changes in amplitude occurring at maximum rate,
    forming a third electrical signal corresponding to slow amplitude variations of said video signals between the second of said changes in amplitude occurring at maximum rate and the next succeeding of said changes,
    alternately forming further sequences of said second and third electrical signals between further said changes,
    delaying said second electrical signal,
    storing a sequence of said delayed electrical signal,
    electrically comparing each successive sequence with the prior stored sequence,
    inhibiting recording of each said successive sequence when the same does not differ from the prior sequence,
    similarly storing, electrically comparing and inhibiting recording of successive sequences of said third electrical signal,
    transversely recording the uninhibited said second electrical signal upon one side of a first record and recording the uninhibited said third electrical signal upon the other side of said first record,
    transversely recording said first electrical signal upon a second record,
    forming electrical control signals corresponding to periods of inhibition of said recording and to synchronism of traverse of said first and second records,
    and longitudinally recording said control signals uninterruptedly upon a third record.

6. The method of recording images which comprises the steps of
    systematically scanning the image to be recorded,
    forming a first electrical signal corresponding to the location of each significant edge in said image, forming a second electrical signal corresponding to the variation of tonal values between two of said edges, forming a third electrical signal corresponding to the variation of tonal values between the second of said two edges and the next succeeding edge, alternately forming further sequences of said second and third electrical signals between further said edges, delaying said second electrical signal, storing a line of said delayed electrical signal, storing a frame of said delayed electrical signal, electrically comparing each successive line with the prior stored line, inhibiting recording of each said successive line when the same does not differ from the prior line, electrically comparing each successive frame with the prior stored frame, inhibiting recording of each successive frame when the same does not differ from the prior frame, similarly storing, electrically comparing and inhibiting recording of successive lines and of successive frames of said third electrical signal, longitudinally traversing a first record medium save during such periods as when recording is inhibited for said successive frames, transversely recording only the uninhibited said second electrical signal upon one side of said first record and recording only the uninhibited said third electrical signal upon the other side of said first record, longitudinally traversing a second record medium, transversely recording said first electrical signal upon said second record medium, forming electrical control signals corresponding to periods of inhibition of said recording and to synchronism of traverse of said first and second record media, longitudinally traversing a third record medium, and longitudinally recording said electrical control signals uninterruptedly upon said third record medium.

7. In a system for recording video signals sans redundancy having means for separately recording slowly occurring video excursions upon opposite sides of an intermittently-progressed tonal record representing tones in the image being recorded, means for recording control and edge information concerned therewith comprising a magneto-optical recording strip having a magnetic substance upon one side and a photographic substance upon the other side thereof, means to uniformly longitudinally progress said strip, plural magnetic recording heads to record upon said magnetic substance control signals related to the intermittent progression of said tonal record;

a cathode-ray tube having a screen to form a spot of light upon the said screen, deflection means to traverse said spot of light across said screen, a lens to form a reduced image of said spot of light upon said photographic substance of said recording strip, said image having a motion transverse to the direction of progression of said recording strip, and means to modulate said spot of light according to the occurrence of edges in the image represented by said video signals.

8. In a system for recording video signals sans redundancy having means for separately recording slowly occurring video excursions upon plural areas of an intermittently-progressed tonal record representing tones in the image being recorded, means for recording control and edge information concerned therewith comprising a magnetic recording strip, means to uniformly longitudinally move said magnetic strip, plural magnetic means to record control signals related to the intermittent progression of said tonal record and of said edge information;

a cathode-ray tube, means to form and means to traverse a spot of light across said cathode-ray tube, a photographic recording strip, means to intermittently progress said photographic recording strip, means to form a reduced image of said spot of light upon said photographic recording strip to traverse the same transverse to the direction of progression thereof, and means to modulate said spot of light according to the occurrence of edges in the image represented by said video signals.

9. In a system for recording video signals having means for recording video excursions representing edges and control information concerning the progression of a tonal record, means to record video excursions representing tonal information comprising recording means having means to produce two moving spots of light, image-forming means disposed in front of each of said spots of light, means to intermittently transport said tonal record according to said control information, said means to transport positioned to dispose said tonal record between said image-forming means for the formation of an image of one of said spots of light upon one side of said tonal record, means to alternately modulate one said spot of light according to delayed said tonal information and the other said spot of light according to non-delayed said tonal information, the recited means to record proportioned to expose both sides of said tonal record to transverse traverses of optical images of said moving spots of light for recording tonal information thereon.

10. In a system for recording video signals having means for recording rapidly occurring video excursions and control information concerning the progression of a tonal record, means to record slowly occurring video excursions comprising recording means having a light-producing screen, means to produce two moving spots of light upon said screen, a lens disposed in front of each of said spots of light, means to intermittently transport said tonal record according to said control information, said means to transport positioned to dispose said tonal record equally adjacent to said lenses, means to alternately modulate one said spot of light according to one phase of said tonal information and the other said spot of light according to another phase of said tonal information;

the recited means to record proportioned to expose both sides of said tonal record to transverse traverses of reduced optical images of said moving spots of light for recording tonal information thereon.

11. In a system for recording video signals sans redundancy having means for recording rapidly occurring video excursions representing edges and control information concerning the progression of a tonal record, means to record slowly occurring video excursions representing tonal information comprising a cathode-ray tube having two electron streams and a light-producing screen, means to synchronously and proportionally deflect both said electron streams to produce two separated moving spots of light upon said screen, a lens disposed in front of each of said spots of light, means to reflect disposed behind said lenses, means to intermittently longitudinally transport said tonal record according to said control information, said means to transport positioned to dispose said tonal record between said means to reflect, means to alternately modulate one said electron stream according to delayed said tonal information and the other said electron stream according to non-delayed said tonal information;

the recited means to record proportioned to expose both sides of said tonal record to transverse traverses of reduced optical images of said moving spots of light for the recording to tonal information thereon.

12. Means to record video signals comprising a video signal source, a first low pass filter connected to said source, video delay means connected to said source, a second low pass filter connected to said delay means, an edge detector to provide an output for each rapid excursion of the video signal, said edge detector connected to said delay means, relaxation means to form a mark -space signal having a transition between a mark and a space for each output of said edge detector, a first recording medium, first means to transversely record said mark -space signal upon said first recording medium, video signal storage means connected to said delay means, comparator means connected to said delay means and to said storage means to provide an output upon successive sequences having the same video content, repeat gate means -occurring connected to said comparator means and to said second filter to pass tonal information from said second filter only when an output is absent from said comparator means, a second recording medium, transport means to longitudinally progress said second recording medium, repeat means to inhibit longitudinal progress of said second recording medium when an output is present from said comparator means, said repeat means connected to said repeat gate means -occuring and to said transport means, mark means to record on one side of said second medium transversely thereof tonal information from said low pass filters, repeat gate means -impending, and space means to record on the other side of said second medium transverse thereof, said repeat gate means -impending connected to said first low pass filter, said mark means and said space means to record each connected to both said repeat gate means, maximum video frequency means connected to said low pass filter, phrase control means connected to said maximum video frequency means and actuated thereby to provide an approximately order-related velocity of scan, said phrase control means connected to both said mark and said space means to record, a third recording medium, and means to uniformly longitudinally translate said third recording medium, said control means connected to said repeat means to record repeat instructions.

13. Means to record video signals at reduced redundancy comprising a video signal source, a first frequency-limiting means connected to said source, video delay means connected to said source, a second frequency-limiting means connected to said delay means, an edge detector to provide an output with each excursion of the video signal having a rapidity greater than a given degree of rapidity, said edge detector connected to said source, relaxation means to form a mark -space signal having a transition between a mark and a space for each output of said edge detector, a first recording medium, first means to uniformly longitudinally translate said first recording medium, first means to transversely record said mark -space signal upon said first recording medium, line storage means connected to said delay means, line comparator means connected to said delay means and to said line storage means to provide an output upon successive lines having the same video content, a line repeat gate -occurring connected to said line comparator means and to said second frequency-limiting means to pass tonal information from said second frequency-limiting means only when an output is absent from said line comparator means, frame storage means connected to said delay means, frame comparator means connected to said delay means and to said frame storage means to provide an output upon successive frames having the same video content, a frame repeat gate -occurring connected to said frame comparator means and to said second frequency-limiting means to pass tonal information from said second frequency-limiting means only when an output is absent from said frame comparator means, a second recording medium, transport means to longitudinally progress said second recording medium, frame repeat means to inhibit longitudinal progress of said second recording medium when an output is present from said frame comparator means, said frame repeat means connected to said frame repeat gate -occurring and to said transport means, mark means to record tonal information on one side of said second medium transverse thereof, a line repeat gate -impending, a frame repeat gate -impending, and space means to record tonal information on the other side of said second medium transverse thereof, said line repeat gate-impending and said frame repeat gate -impending connected to said first frequency-limiting means, to said mark means and to said space means-to-record, maximum video frequency means connected to said first frequency-limiting means, phrase control means connected to said maximum video frequency means and actuated thereby to provide an octave-related velocity of scan, said phrase control means connected to both said mark and said space means-to-record, control means to record control signals upon said first recording medium connected to said frame repeat means to record frame repeat instruction, line repeat means connected to said line comparator means and to said control means to record line repeat instructions, and servo means connected to said control means and to said second transport means to synchronize the recited recording processes.

14. Means to record video signals sans redundancy comprising a video signal source, a first low pass filter connected to said source, video delay means connected to said source, a second low pass filter connected to said delay means, an edge detector to provide an output of polarity consonant with each excursion of the video signal having a rapidity greater than a given degree of rapidity, said edge detector connected to said delay means, relaxation means to form a mark -space signal having a transition between a mark and a space for each output of said edge detector, a first recording medium,
a first transducer to transversely record said mark-space signal upon said first recording medium,
line storage means connected to said delay means,
a line comparator connected to said delay means and to said line storage means to provide an output upon successive lines having the same video content,
a line repeat gate -occurring connected to said line comparator and to said second filter to pass tonal information from said second filter only when an output is absent from said line comparator,
frame storage means connected to said delay means,
a frame comparator connected to said delay means and to said frame storage means to provide an output upon successive frames having the same video content,
a frame repeat gate -occurring connected to said frame comparator and to said second filter to pass tonal information from said second filter only when an output is absent from said frame comparator,
a second recording medium,
a transport to longitudinally progress said second recording medium,
frame repeat means to inhibit longitudinal progress of said second recording medium when an output is present from said frame comparator,
said frame repeat means connected to said frame repeat gate -occurring and to said transport,
a mark transducer to record tonal information on one side of said second medium transverse thereof,
a line repeat gate -impending,
a frame repeat gate -impending,
and a space transducer to record tonal information on the other side of said second medium transverse thereof,
said line repeat gate -impending and said frame gate -impending connected to said first low pass filter,
said mark and said space transducers each connected to said repeat gates,
a maximum video frequency detector connected to said first low pass filter,
a phrase control connected to said maximum video frequency detector and actuated thereby to provide an octave-related velocity of scan,
said phrase control connected to both said mark and said space transducers to control the velocity of recording thereon,
a third recording medium,
a transport to uniformly longitudinally translate said third recording medium,
control means to record control signals upon said third recording medium connected to said frame repeat means to record frame repeat instructions,
line repeat means connected to said line comparator and to said control means to record line repeat instructions,
servo means connected to said control means and to said transport to translate said third medium to synchronize the recited recording processes,
a monitor,
said monitor connected to said first transducer, said mark and said space transducers to synthesize said video signal from edge and tonal information therefrom,
and controls upon said first and said second low pass filters to adjust the same according to the appearance of the image upon said monitor.

References Cited by the Examiner

UNITED STATES PATENTS

| | | | |
|---|---|---|---|
| 1,910,586 | 5/33 | Bartholomew et al. | 178—6.6 |
| 2,000,527 | 5/35 | Linderman | 346—135 |
| 2,294,149 | 8/42 | Kline et al. | 346—135 |
| 2,306,435 | 12/42 | Graham | 178—6.8 |
| 2,677,012 | 4/54 | Bach | 178—7.4 |
| 2,682,572 | 6/54 | Graham | 178—5.8 |
| 2,690,472 | 9/54 | Boucheron | 178—5.8 |
| 2,724,780 | 11/55 | Harris | 307—88.5 |
| 2,795,695 | 6/57 | Raynsford | 328—133 |
| 2,899,567 | 8/59 | Romano | 307—81 |
| 2,915,584 | 12/59 | Daugherty | 178—7.4 |
| 2,920,212 | 1/60 | Kyle et al. | 307—81 |
| 2,956,115 | 10/60 | Hefele | 178—6.6 |
| 2,957,941 | 10/60 | Covely | 178—6.8 |
| 2,981,853 | 4/61 | Meyer | 307—88.5 |
| 2,993,174 | 7/61 | Lader et al. | 328—133 |
| 3,036,291 | 5/62 | Whittle | 340—172.5 |

DAVID G. REDINBAUGH, *Primary Examiner.*

BERNARD KONICK, *Examiner.*